US011312665B2

(12) United States Patent
Lopez et al.

(10) Patent No.: US 11,312,665 B2
(45) Date of Patent: Apr. 26, 2022

(54) MICROFIBRILLATED CELLULOSE AS RHEOLOGY MODIFIER IN HIGH IONIC STRENGTH AGRICULTURAL FORMULATIONS

(71) Applicant: AMVAC Chemical Corporation, Newport Beach, CA (US)

(72) Inventors: Humberto Benito Lopez, Chino Hills, CA (US); Lisiane Zeni, Newport Beach, CA (US)

(73) Assignee: AMVAC Chemical Corporation, Newport Beach, CA (US)

( * ) Notice: Subject to any disclaimer, the term of this patent is extended or adjusted under 35 U.S.C. 154(b) by 0 days.

(21) Appl. No.: 16/751,423

(22) Filed: Jan. 24, 2020

(65) Prior Publication Data

US 2020/0239375 A1    Jul. 30, 2020

Related U.S. Application Data

(60) Provisional application No. 62/797,124, filed on Jan. 25, 2019, provisional application No. 62/896,762, filed on Sep. 6, 2019, provisional application No. 62/916,764, filed on Oct. 17, 2019.

(51) Int. Cl.

| C05B 15/00 | (2006.01) |
| C05G 5/12 | (2020.01) |
| C05G 5/18 | (2020.01) |
| C05G 3/60 | (2020.01) |
| C05G 5/20 | (2020.01) |
| A01N 25/04 | (2006.01) |
| A01N 25/26 | (2006.01) |
| A01N 53/00 | (2006.01) |
| A01N 57/12 | (2006.01) |
| A01N 25/02 | (2006.01) |
| A01N 25/30 | (2006.01) |
| C05G 3/40 | (2020.01) |
| C08L 1/02 | (2006.01) |

(52) U.S. Cl.
CPC .............. *C05B 15/00* (2013.01); *A01N 25/02* (2013.01); *A01N 25/04* (2013.01); *A01N 25/26* (2013.01); *A01N 25/30* (2013.01); *A01N 53/00* (2013.01); *A01N 57/12* (2013.01); *C05G 3/44* (2020.02); *C05G 3/60* (2020.02); *C05G 5/12* (2020.02); *C05G 5/18* (2020.02); *C05G 5/20* (2020.02); *C08L 1/02* (2013.01)

(58) Field of Classification Search
None
See application file for complete search history.

(56) References Cited

U.S. PATENT DOCUMENTS

| 4,341,807 | A | 7/1982 | Turbak et al. |
| 4,374,702 | A | 2/1983 | Turbak et al. |
| 4,481,077 | A | 11/1984 | Herrick |
| 5,185,024 | A | 2/1993 | Siemer et al. |
| 5,385,640 | A | 1/1995 | Weibel et al. |
| 5,405,953 | A | 4/1995 | Banker et al. |
| 8,420,573 | B2 | 4/2013 | Stern |
| 8,807,870 | B2 | 8/2014 | Laukkanen et al. |
| 2005/0034636 | A1 | 2/2005 | Schlesiger et al. |
| 2010/0120617 | A1 | 5/2010 | Dyllick-Brenzinger et al. |
| 2013/0331267 | A1 | 12/2013 | Aulisa |
| 2014/0011675 | A1* | 1/2014 | Knochenmus ........... C05G 3/60 504/101 |
| 2014/0066303 | A1 | 3/2014 | Liu et al. |
| 2014/0274719 | A1* | 9/2014 | Davison .................. C05G 3/00 504/297 |
| 2014/0342905 | A1* | 11/2014 | Bullis ..................... A01N 63/10 504/100 |
| 2015/0133296 | A1* | 5/2015 | Ugalde Martinez ... A01N 65/26 504/101 |
| 2015/0239788 | A1* | 8/2015 | Yamashita .............. C05B 17/00 504/101 |
| 2016/0032168 | A1 | 2/2016 | Al-Bagoury et al. |
| 2016/0227782 | A1* | 8/2016 | Oevreboe ............. A01N 47/36 |
| 2017/0121908 | A1 | 5/2017 | Holtan et al. |
| 2017/0273298 | A1* | 9/2017 | Rosenberg Read ... A01N 25/00 |
| 2020/0236926 | A1 | 7/2020 | Lopez et al. |
| 2020/0260721 | A1 | 8/2020 | Lopez et al. |
| 2020/0392051 | A1* | 12/2020 | Casalins Cunado ..... C05G 5/27 |
| 2021/0127684 | A1* | 5/2021 | Singh ....................... C05G 3/70 |

FOREIGN PATENT DOCUMENTS

| CN | 102100229 A | 6/2011 |
| CN | 105229228 A | 1/2016 |
| EP | 0 298 136 A1 | 1/1989 |
| GB | 228237 B | 1/1998 |
| WO | WO-99/55645 A1 | 11/1999 |
| WO | WO-01/66600 A1 | 9/2001 |
| WO | WO-2007/091942 A1 | 8/2007 |

(Continued)

OTHER PUBLICATIONS

International Search Report and Written Opinion issued in International Application No. PCT/US20/15088, dated Jun. 4, 2020 (Jun. 4, 2020). 12 pages.
U.S. Appl. No. 16/751,410.
U.S. Appl. No. 16/751,441.
"SmartChoiceTM HC" Safety Data Sheet. AMVAC. 1449 Version #: 3.0, Revision date May 9, 2018, Issue date Apr. 6, 2016. 11 pages.
CAS Registry No. 11138-66-2, date accessed Apr. 20, 2020. 1 page.
CAS Registry No. 141-43-5, date accessed Apr. 20, 2020. 1 page.

(Continued)

*Primary Examiner* — Wayne A Langel
(74) *Attorney, Agent, or Firm* — Mintz Levin Cohn Ferris Glovsky and Popeo, P.C.; Marc T. Morley

(57) ABSTRACT

Described herein, inter alia, is a concentrate including a high ionic strength liquid and a microfibrillated cellulose, and methods of making the same.

33 Claims, No Drawings

(56) References Cited

FOREIGN PATENT DOCUMENTS

| WO | WO 2014/203121 A1 * | 12/2014 | ............ C09K 17/32 |
|----|---------------------|---------|------------------------|
| WO | WO-2015/180844 A1 | 12/2015 | |
| WO | WO-2019/035881 A1 | 2/2019 | |
| WO | WO-2019/035881 A8 | 2/2020 | |

OTHER PUBLICATIONS

CAS Registry No. 2634-33-5, date accessed Apr. 20, 2020. 1 page.
CAS Registry No. 54593-83-8, date accessed on Apr. 20, 2020. 1 page.
CAS Registry No. 57-55-6, date accessed Apr. 20, 2020. 1 page.
CAS Registry No. 64742-94-5, date accessed Apr. 20, 2020. 1 page.
CAS Registry No. 7732-18-5, date accessed Apr. 20, 2020. 1 page.
CAS Registry No. 82657-04-3, date accessed Apr. 20, 2020. 1 page.
CAS Registry No. 9004-34-6, date accessed Apr. 20, 2020. 4 pages.
Castro, M.J.L. et al. (2013). "Surfactants in Agriculture." Chapter 7—Green Materials for Energy, Products and Depollution, Environmental Chemistry for a Sustainable World 3. pp. 287-334.
International Search Report and Written Opinion issued in International Application No. PCT/US20/15084, dated Apr. 16, 2020 (Apr. 16, 2020). 8 pages.
International Search Report and Written Opinion issued in International Application No. PCT/US20/15086, dated Mar. 31, 2020 (Mar. 31, 2020). 9 pages.
SciFinder. (2021). *Microfibrillated celluloses and Fertilizers*. [Search Results]. Retrieved Jul. 15, 2021, 210 pages.
SciFinder. (2021). *Microfibrillated celluloses and Rheology Modifier and Pesticide*. [Search Results]. Retrieved Jul. 15, 2021, 4 pages.

\* cited by examiner

MICROFIBRILLATED CELLULOSE AS RHEOLOGY MODIFIER IN HIGH IONIC STRENGTH AGRICULTURAL FORMULATIONS

CROSS-REFERENCES TO RELATED APPLICATIONS

This application claims the benefit of provisional application Ser. No. 62/797,124 filed Jan. 25, 2019, provisional application Ser. No. 62/896,762 filed Sep. 6, 2019, and provisional application Ser. No. 62/916,764 filed Oct. 17, 2019, each of which are incorporated herein by reference.

BACKGROUND

Agricultural formulations with high ionic strength include formulations of glufosinate and glyphosate as well as fertilizers such as 10-34-0 and 6-24-6 starter fertilizers and many other materials that contain ammonium, phosphate, potassium, micronutrients and many other highly ionic salts. Such formulations enhance agricultural yields as well as act as an aid in harvesting and processing of agricultural products, and provide aesthetic value in turf and ornamental applications. While it is desirable to combine these highly ionic formulations with other agrochemical active ingredients in single formulations, the ionic formulations are frequently applied separately due to incompatibility.

BRIEF SUMMARY

In some aspects, there are provided compositions comprising a microfibrillated cellulose, a medium having a high ionic strength, optionally an agriculturally active compound, and optionally a biostimulant, wherein the composition exhibits thixotropy.

In some aspects, there are provided compositions comprising a fertilizer and microfibrillated cellulose.

In some aspects, there are provided methods comprising mixing a fertilizer with a microfibrillated cellulose to form a mix-ready fertilizer adjuvant.

DETAILED DESCRIPTION

High ionic strength media are often applied diluted in water but in many circumstances, especially in the case of fertilizers and micronutrients, they are applied neat. While it can be beneficial to combine agrochemical formulations of various types with high ionic strength media to serve multiple purposes, certain classes of products do not lend themselves to be combined in the context of high ionic strength. In particular, high ionic strength media are known to be difficult to combine with emulsifiable concentrates (EC), suspension concentrates (SC), capsule suspensions (CS), wettable granules (WG), and the like, either as formulated products or as tank mixes. Most formulations of the above referenced type do not disperse well or flocculate in the presence of these highly ionic liquids. The problem is compounded by the presence of certain multivalent cations such as calcium ion or magnesium ion, where even relatively very low concentrations of these ions tend to cause conventional polysaccharide-based rheology modifiers to flocculate. The importance of this problem is evident from the large number of commercially available adjuvants purportedly provided as compatability agents for mixes with fertilizer or highly ionic media.

In particular, a rheology modifier compatible with emulsifiable concentrates (EC), capsule suspensions (CS), suspension concentrates (SC) and other type of formulations containing either particulates or oils (as droplets) in high ionic media, such as fertilizer, micronutrients rich in multivalent cations, and other highly ionic media would be very valuable. The value increases substantially if these formulations can be maintained over prolonged periods of time to allow the product to be stored and used at a later time without settling, separation or flocculation. However, the use of conventional rheology modifiers such as xanthan gum, gellan gum, alginate, guar gum or other polysaccharides as agents for creating rheological structure in highly ionic media has had limited success because the polysaccharides tend to flocculate rather than impart the desired rheology. Similarly, the use of clays, alumino silicates and other hydrophilic or hydrophobic silicas has proven to have limited success as they are very formulation specific and work only on limited cases.

In accordance with embodiments herein, it was therefore surprising that the use of microfibrillated cellulose (another polysaccharide-base rheology agent) has allowed the formation of rheological structure in these highly ionic systems, including in the presence of low concentrations of multivalent cations, without the drawbacks observed with conventional rheological modifiers. Microfibrillated cellulose allows one to create structure in a large variety of fertilizer solutions, glufosinate and glyphosate ammonium and potassium and other highly ionic media as well as in many ionic salts of organic weak acids used as insecticides, herbicides, fungicides, and the like. Moreover, these systems can be stabilized for weeks or even months.

I. Definitions

The abbreviations used herein generally comport with their conventional meaning within the chemical and biological arts. Unless specifically indicated otherwise, all technical and scientific terms used herein have the same meaning as commonly understood by those of ordinary skill in the art. In addition, any method or material similar or equivalent to a method or material described herein can be used in the practice of the embodiments disclosed herein. For purposes of the present embodiments, the following terms are defined.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

"Composition" as used herein is intended to encompass a product comprising the specified ingredients in the specified amounts, as well as any product, which results, directly or indirectly, from combination of the specified ingredients in the specified amounts.

As used herein, "agriculturally active compound," or "agricultural active," refers to a compound or substrate which have an effect on agricultural crops, including pesticidal and herbicidal effects, among others.

As used herein "ionic strength" refers to a measure of the concentration of ions (i.e., electrically charged species) in a solution. For the purpose of determining whether ionic strength is "high," an ionic strength is "high" when conventional rheology modifiers such as xanthan and/or guar gums begin to agglomerate and/or otherwise fail to impart sustained thixotropic character to the composition. "High ionic strength" includes ion concentrations obtained from solutions that are about 5% of saturation in any functional ion. For example, NaCl is soluble in water at saturation at about 360 g/L. Accordingly, a "high ionic strength" relative to NaCl would include 18 g NaCl/L in water. With respect to the performance of MFC compared to such agents as xanthan gum, MFC also benefits from compatibility with cationic surfactants and multivalent cations (which are ubiquitous in micronutrients) where xanthan gum fails. In the case of multivalent cations, the concentrations of such ions can be very low, including trace amounts, and still cause agglomeration of xanthan gum or guar gum.

As used herein, the term "dry matter weight concentration" refers to the absolute weight percent of MFC, excluding water and other absorbed liquids in the formulation. The term "dry matter," or "solids content," in the context of the amount of MFC refers to the amount of MFC if all the solvent (typically water) is removed. Accordingly, providing the amount of MFC as a concentration of "dry matter" provides the amount as "% w/w" relative to the overall weight of the composition in the absence of solvent.

As used herein, "thixotropy" refers to a time-dependent shear thinning property of a composition. A composition exhibits thixotropy when it is viscous under static conditions but flows (e.g., becomes thinner, becomes less viscous) over time when subjected to an applied stress, such as being shaken, agitated, pumped, mixed or subjected to shear-stress.

As used herein, a "mix-ready fertilizer adjuvant" refers to a product that can be provided in a kit form, along with instructions to mix compositions comprising MFC and fertilizer with an agriculturally active compound or as an additive to mix with a pre-fabricated agricultural formulation. Such formulations include, without limitation, suspension concentrates, suspo-emulsions, capsule suspensions, microemulsions, and the like.

"Microfibrillated cellulose," or "MFC," (also known as "reticulated" cellulose or as "superfine" cellulose, or as "cellulose nanofibrils") is a cellulose-based product and is described, for example, in U.S. Pat. Nos. 4,481,077, 4,374,702 and 4,341,807, each of which is incorporated herein by reference. In embodiments, microfibrillated cellulose has reduced length scales (diameter, fibril length) vis-à-vis cellulose fibers, improved water retention and adjustable viscoelastic properties. MFC with improved or tailored properties for specific applications are known, such as those disclosed in WO 2007/091942 and WO 2015/180844, each of which is incorporated herein by reference.

Microfibrillated cellulose (MFC) is a product derived from cellulose and is commonly manufactured in a process in which cellulose fibers are opened up and unraveled to form fibrils and microfibrils/nanofibrils by (repeated) passage through a geometrical constraint. For example, MFC may be produced as disclosed in WO 2015/180844 by passing a liquid composition of cellulose through a small diameter orifice in which the composition is subjected to a pressure drop of at least 3000 psig and a high velocity shearing action followed by a high velocity decelerating impact. The passage of the MFC composition through the orifice is repeated until the cellulose composition becomes a substantially stable composition. This process converts the cellulose into microfibrillated cellulose, which has valuable physical properties (gel forming capability, thixotropic properties, high water retention value WRV and the like) without substantial chemical change of the cellulose starting material.

Another process for manufacturing microfibrillated cellulose is described in U.S. Pat. No. 5,385,640 which discloses a means for refining fibrous cellulosic material into a dispersed tertiary level of structure and thereby achieving desirable properties attendant with such structural change. The cellulosic fiber produced in this way is referred to as "microdenominated cellulose (MDC)", a sub-group of microfibrillated cellulose. Such microfibrillated cellulose is obtained by repeatedly passing a liquid composition of fibrous cellulose through a zone of high shear, which is defined by two opposed surfaces, with one of the surfaces rotating relative to the other, under conditions and for a length of time sufficient to render the composition substantially stable and to impart to the composition a water retention that shows consistent increase with repeated passage of the cellulose composition through the zone of high shear. This process increases the viscosity and leads to a gel structure, until no further increase in viscosity is achieved. After such a treatment, homogeneous MFC is obtained and the conversion of cellulose to microcellulose as such is concluded.

"Microfibrillated cellulose" (MFC) in accordance with embodiments disclosed herein is to be understood as relating to cellulose fibers that have been subjected to a mechanical treatment resulting in an increase of the specific surface and a reduction of the size of cellulose fibers, in terms of cross-section (diameter) and/or length, wherein said size reduction leads to "fibrils" having a diameter in the nanometer range and a length in the micrometer range.

The starting cellulose material to generate MFC does not contain a significant portion of individualized and "separated" cellulose "fibrils." The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 microns (with the length of these fibres being even greater). When the cellulose fibres are microfibrillated, a heterogeneous mixture of "released" fibrils with cross-sectional dimensions and lengths from nm to microns may result. Fibrils and bundles of fibrils may co-exist in the resulting microfibrillated cellulose.

Microfibrillated cellulose contains fibrils in constant interaction with each other in a three-dimensional network. The rheological properties of MFC—high viscosity at rest, shear thinning (thixotropic) behavior, water holding capacity—are a result of the existence of this entangled network.

In the MFC products disclosed herein, individual fibrils or fibril bundles can be identified and easily discerned by way of conventional optical microscopy, for example at a magnification of 40× or by use of electron microscopy.

As indicated above any type of microfibrillated cellulose (MFC) may be used in connection with embodiments disclosed herein as long as the fiber bundles as present in the original cellulose pulp are sufficiently separated in the process of making MFC so that the average diameter of the resulting fibrils is in the nanometer-range and therefore more surface of the overall cellulose-based material has been created, vis-à-vis the surface available in the original cellulose material. MFC may be prepared according to any of the processes described in the art, including the references specifically cited above.

In embodiments, the microfibrillated cellulose may be characterized by the following features: The microfibrillated cellulose forms a gel-like dispersion that has a zero shear viscosity, $\eta 0$, of at least 2000 PaS, or at least 3000 Pa·s or 4000 Pa·s, or at least 5000 Pa·s, or at least 6000 Pa·s, or at least 7000 Pa·s, as measured in polyethylene glycol (PEG) as the solvent, and at a solids content of the MFC of about 0.65%.

The rheological properties, in particular zero shear viscosity can be measured on a rheometer of the type Anton Paar Physica MCR 301. The temperature in all measurements can be performed at 25° C. and a "plate-plate" geometry used (diameter: 50 mm). The rheological measurement can be performed as an oscillating measurement (amplitude sweep) to evaluate the degree of structure in the dispersions and as rotational viscosity measurements, in which case the viscosity may be measured as a function of the shear rate to evaluate the viscosity at rest (shear forces→0), as well as the shear thinning properties of the dispersions. The measurement method is further described in PCT/EP2015/001103 (EP 3 149 241).

In embodiments, the microfibrillated cellulose has a water holding capacity (also water retention capacity) of more than 40, or more than 50, or more than 60, or more than 70, or more than 75, or more than 80, or more than 90, further or more than 100. The water holding capacity is given as $(mV/mT)^{-1}$ where mV is the weight of the wet sediment and mT is the weight of dry MFC analyzed. The water holding capacity describes the ability of the MFC to retain water within the MFC structure and this relates to the accessible surface area. The water holding capacity can be measured by diluting the MFC samples to a 0.3% solids content in water and then centrifuging the sample at 1000 G for 15 minutes. The clear water phase can be separated from the sediment and the sediment weighed. The measurement method is further described in PCT/EP2015/001103 (EP 3 149 241).

There is no specific restriction in regard to the origin of the cellulose, and hence of the microfibrillated cellulose employed in embodiments disclosed herein. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g., from tunicates.

In embodiments, wood-based materials are used as raw materials, either hardwood or softwood or both (in mixtures). In embodiments, softwood is used as a raw material, either one kind or mixtures of different soft wood types.

Modified (derivatized) and non-modified (un-derivatized) cellulose/MFC may be employed. In embodiments, the microfibrillated cellulose may be unmodified with respect to its functional groups or may be physically modified or chemically modified, or both.

Chemical modification of the surface of the cellulose microfibrils may be achieved by various possible reactions of the surface functional groups of the cellulose microfibrils such as functionalizing of the hydroxyl groups, including by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

In embodiments, cellulose microfibrils may be modified by a physical route, either by adsorption at the surface, or by spraying, or by coating, or by encapsulation of the microfibril. In embodiments, modified microfibrils can be obtained by physical adsorption of at least one compound. The MFC may also be modified by association with an amphiphilic compound (surfactant).

In embodiments, the microfibrillated cellulose is not physically modified.

In embodiments, the microfibrillated cellulose is a non-modified microfibrillated cellulose, such as a non-modified microfibrillated cellulose derived from plant material.

In embodiments, the microfibrillated cellulose is prepared by a process, which comprises at least the following steps: (a) subjecting a cellulose pulp to at least one mechanical pretreatment step; (b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose; wherein the homogenizing step (b) involves compressing the cellulose pulp from step (a) and subjecting the cellulose pulp to a pressure drop.

The mechanical pretreatment step can include a refining step. The purpose of the mechanical pretreatment is to "beat" the cellulose pulp in order to increase the accessibility of the cell walls, i.e., to increase the surface area.

Prior to the mechanical pretreatment step, or in addition to the mechanical pretreatment step, enzymatic (pre)treatment of the cellulose pulp is an optional additional step that may be desirable for some applications. In regard to enzymatic pretreatment in conjunction with microfibrillating cellulose, the respective content of WO 2007/091942 is incorporated herein by reference. Any other type of pretreatment, including chemical pretreatment may also be performed.

In the homogenizing step (b), which is to be conducted after the (mechanical) pretreatment step, the cellulose pulp slurry from step (a) is passed through a homogenizer at least once, or at least two times, as described, for example, in PCT/EP2015/001103, the respective content of which is hereby incorporated by reference.

As used herein, the term "suspension concentrate," or "SC," refers to a stable suspension of an agricultural active compound in an aqueous continuous phase which is intended for dilution with water before use. SC preparations generally display non-Newtonian flow characteristics.

As used herein, the term "suspo-emulsion," or "SE," refers to a stable suspension of fine particles combined with an emulsion of fine droplets of an oil in an aqueous continuous phase.

As used herein, the term "capsule suspension," or "CS," refers to a stable suspension of an encapsulated agricultural active compound in an aqueous continuous phase which is intended for dilution with water before use. The encapsulation is generally provided by polymeric compositions including, without limitation, polyureas, polyurethanes, cyclodextrins, and functionally similar systems.

As used herein, the term "oil dispersion," or "oil-based suspension concentrate," or "OD," refers to a stable suspension of an agricultural active ingredient in an organic solvent fluid (and may contain other dissolved compounds) which is intended for dilution with water before use.

In general, agricultural active compounds may be provided in "particulate form." As used herein, "particulate form" may include encapsulated agricultural active compounds (to form capsule suspensions), gels, wettable powders (WP), water dispersible powders for slurry seed treatment (WS), water dispersible granules (WG), emulsifiable granules (EG), and emulsifiable powders (EP). Gels include any organic polymer capable of forming gel particles, such as acrylic acid-based gels, including polyacrylamide, polyammonium acrylate and the like. Examples of such gels are disclosed in U.S. Pat. No. 5,185,024, which is incorpated herein by reference in its entirety. WP particulates are homogenous solids of an agricultural active together with optional fillers and other formulation ingredients in a fine powder form, generally free of visible extraneous matter and hard lumps. WS particulates are homogenenous solids of an agricultural active together with a carrier and other formulation ingredients, typically including a colorant, and in the form of a powder, generally free of visible extraneous matter and hard lumps. WG particulates are homogeneous solids of an agricultural active together with carriers and other formulation ingredients and typically designed to disintegrate in water to form a colloidal suspension. WG are generally free-flowing, mostly dust free, and generally free of visible extraneous matter and hard lumps. EG particulates are granules of an agricultural active which may be dissolved in an organic solvent together with other formulation ingredients. EG particulates are generally homogenous, and generally free of visible extraneous matter and hard lumps. EP particulates are homogenous mixtures of an agricultural active together with other formulation ingredients and supplied free-flowing powder generally free of visible extraneous matter and hard lumps, and which form an emulsion upon dilution with water.

As used herein, "biostimulant" refers to compounds or substrates used to stimulate natural processes of plants to enhance and/or benefit crop quality, soil health, nutrient efficiency, nutrient uptake, and reduce abiotic stress. Plant biostimulant products can be used in sustainable agriculture production systems and integrated pest management (IPM) programs, which can reduce the amount of irrigation water used, as well as the amount of agrochemical supplements and fertilizers. Biostimulants include, but are not limited to protein hydrolysates, humic and fulvic acids, seaweed extracts, chitosans, biopolymers, inorganic compounds, and probiotics.

II. Compositions

In embodiments, there are provided compositions comprising a microfibrillated cellulose, a medium having a high ionic strength, and optionally an agriculturally active ingredient, wherein the composition exhibits shear thinning behavior. Rheological structure is defined by the values measured of certain parameters well understood in the science of rheology. These include the storage modulus (also commonly denoted as G' in rheology) and the loss modulus (also known as G" in rheology). Included in the definition of rheological structure is what is known as shear thinning behavior in rheology. This behavior is very useful in practical applications as a fluid will have a high viscosity upon standing on the shelf and be less susceptible to separation and settling but will be easy to handle when shaken or pumped.

High ionic strength liquids such as fertilizers, glyphosate salt solutions and glufosinate salt solutions, in the absence of MFC, behave as Newtonian fluids in that they are not shear thinning. Surprisingly the addition of microfibrillated cellulose adds structure and provides compositions that exhibit shear thinning behavior.

The ability to create structure in highly ionic liquids allows us to prolong the shelf life of formulations where oils or particulates have been dispersed in these highly ionic liquids. For example, a capsule suspension (CS) can be dispersed in a glufosinate solution and remain suspended for a year thus making the product commercially viable. Another example is when an emulsifiable concentrate is dispersed in a solution of fertilizer and it can remain suspended through the application period which can be one week thus allowing a material which would otherwise immediately separate to be applied and give the farmer an advantage in his ability to plant more efficiently.

In embodiments, there are provided compositions comprising a high ionic strength liquid, and a microfibrillated cellulose. In embodiments, there are provided compositions consisting essentially of a high ionic strength liquid, and a microfibrillated cellulose. In embodiments, there are provided compositions comprising a fertilizer, and a microfibrillated cellulose. In embodiments, there are provided compositions consisting essentially of a fertilizer, and a microfibrillated cellulose.

In embodiments, the compositions may comprise at least one of fertilizer, pesticide, fungicide, insecticide, herbicide, growth regulator, safener, and micronutrient.

In embodiments, composition may comprise a fertilizer, wherein the fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-40:0-50:0-40, with the proviso that at least one of the value of the nitrogen source, the phosphorus, and the potassium source is not zero.

In embodiments, the nitrogen source is selected from the group consisting of ammonia, urea, urea phosphate, thiourea, ammonium sulfate, ammonium nitrate, potassium nitrate, ammonium phosphate, ammonium polyphosphate, ammonium chloride, diammonium phosphate (DAP), urea triazone, amino acids, aromatic nitrogen or heterocyclic nitrogen compounds, hexamethylene tetraamine, melamine, nitrobenzene, and mixtures thereof.

In embodiments, the phosphorous source is selected from the group consisting of phosphate salts, phosphite salts, calcium phosphate, nitro phosphate, potassium phosphate, mono ammonium phosphate, di-ammonium phosphate, triple super phosphate, phosphoric acid, phosphorous acid, polyphosphoric acid, HEDP (1-hydroxyethane 1,1-diphosphonic acid), AMP (Adenosine monophosphate), amino-tris (methylenephosphonic acid), phosphorous pentoxide, and mixtures thereof.

In embodiments, the potassium source is selected from the group consisting of potassium sulfate, potassium phosphate, potassium oxide, potassium hydroxide, potassium chloride, potassium nitrate, potassium carbonate, potassium bicarbonate, potassium magnesium sulfate, and mixtures thereof.

In embodiments, the compositions may comprise a herbicide selected from the group consisting of glyphosate, glufosinate, thiocarbamates, difenzoquat, pyridazinone, nicotinanilide, fluridone, isoxazolidinone, diphenylether; N-phenylphthalimide, oxadiazole, triazolinone, chloroacetamides, oxyacetamide, phthalamate, N-phenylphthalimide, oxadiazole, triazolinone, acetamides, benzoylisoxazol, isoxazole, pyrazole, pyrazolium, triketone, benzofuran, acetochlor, clethodim, dicamba, flumioxazin, fomesafen, metolachlor, triasulfuron, mesotrione, quizalofop, saflufenacil, sulcotrione, 2,4-dichlorophenoxyacetic, salts thereof, and mixtures thereof.

In embodiments, the compositions may comprise a micronutrient comprises an element selected from the group consisting of boron, copper, manganese, iron, chlorine, molybdenum, zinc, and mixtures thereof.

In embodiments, the composition is formulated as an emulsifiable concentrate (EC), suspension concentrate (SC), capsule suspension (CS), water-soluble concentrate (SL), an emulsion (EW), a micro-emulsion (ME), an oil-based suspension concentrate (OD), an aqueous suspo-emulsion (SE), or a microencapsulated suspension (CS).

In embodiments, the composition is formulated as an emulsifiable concentrate (EC), suspension concentrate (SC), capsule suspension (CS), water-soluble concentrate (SL), an emulsion (EW), a micro-emulsion (ME), an oil-based suspension concentrate (OD), an aqueous suspo-emulsion (SE), or a microencapsulated suspension (CS). In embodiments, the composition is formulated as an emulsifiable concentrate (EC). In embodiments, the composition is formulated as a suspension concentrate (SC). In embodiments, the composition is formulated as a capsule suspension (CS). In embodiments, the composition is formulated as a water-soluble concentrate (SL). In embodiments, the composition is formulated as an emulsion (EW). In embodiments, the composition is formulated as a micro-emulsion (ME). In embodiments, the composition is formulated as an oil-based suspension concentrate (OD). In embodiments, the composition is formulated as an aqueous suspo-emulsion (SE). In embodiments, the composition is formulated as a microencapsulated suspension (CS). In embodiments, the composition is formulated as a water dispersible granule or a wettable powder.

In embodiments, the agricultural liquid comprises at least one of glyphosate, glufosinate, and a fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-40:0-50:0-40, with the proviso that at least one of the value of the nitrogen source, the phosphorus, and the potassium source is not zero.

In an aspect is provided a composition comprising: a microfibrillated cellulose; a medium having a high ionic strength; and optionally an agriculturally active ingredient, wherein the composition exhibits thixotropy.

In embodiments, there are provided compositions comprising (a) a microfibrillated cellulose (MFC), (b) a medium resistant to exhibiting thixotropic behavior in the presence of xanthan gum or guar gum, and (c) optionally an agriculturally active ingredient, wherein the composition exhibits thixotropy in the presence of MFC. In embodiments, the medium resistant to exhibiting thixotropic behavior in the presence of xanthan and/or guar gums includes fertilizers, such as fertilizer concentrates, and other agriculturally active ingredients in salt form at high concentrations.

In embodiments, any medium that fails to exhibit the benefits of conventional rheology additives such as xanthan gum or guar gum may realize the desired rheology characteristics by use of microfibrillated cellulose instead. In this context, failure means the conventional rheology modifier suffers from agglomeration and/or does not provide sustained/stable thixotropic behavior to the resultant composition for more than 4 hours.

In embodiments, the high ionic strength of the medium is provided by one or more ions having a concentration of at least about 5% of saturation level. In embodiments, the high ionic strength of the medium is provided by one or more ions having a concentration of at least about 10% of saturation level. In embodiments, the high ionic strength of the medium is provided by one or more ions having a concentration of at least about 20% of saturation level. In embodiments, the high ionic strength of the medium is provided by one or more ions having a concentration of at least about 50% of saturation level. In embodiments, the high ionic strength of the medium is provided by one or more ions having a concentration at about 100% of saturation level.

In embodiments, the medium having high ionic strength comprises a fertilizer. In embodiments, the fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-60:0-60:0-60, with the proviso that at least one of the values of the nitrogen, phosphorus, or potassium source is not zero.

In embodiments, the nitrogen source is selected from the group comprising but not limited to ammonia, urea, urea phosphate, thiourea, ammonium sulfate, ammonium nitrate, potassium nitrate, ammonium phosphate, ammonium polyphosphate, ammonium chloride, diammonium phosphate (DAP), urea triazone, amino acids, aromatic nitrogen or heterocyclic nitrogen compounds, hexamethylene tetraamine, melamine, nitrobenzene, and mixtures thereof.

In embodiments, the phosphorous source is selected from the group comprising but not limited to phosphate salts, phosphite salts, calcium phosphate, nitro phosphate, potassium phosphate, mono ammonium phosphate, di-ammonium phosphate, triple super phosphate, phosphoric acid, phosphorous acid, polyphosphoric acid, HEDP (1-hydroxyethane 1,1-diphosphonic acid, AMP (Adenosine monophosphate), amino-tris(methylenephosphonic acid), phosphorous pentoxide, and mixtures thereof.

In embodiments, the potassium source is selected from the group comprising but not limited to potassium sulfate, potassium phosphate, potassium oxide, potassium hydroxide, potassium chloride, potassium nitrate, potassium carbonate, potassium bicarbonate, potassium magnesium sulfate, and mixtures thereof.

In embodiments, the medium having a high ionic strength comprises an agriculturally active ingredient as a salt.

In embodiments, the medium having a high ionic strength comprises a surfactant. In embodiments, the surfactant is a cationic surfactant. In embodiments, the surfactant is an anionic surfactant. In embodiments, the surfactant is a zwitterionic surfactant. In embodiments the syurfactant is a polymeric or a non-ionic susrfactant.

In embodiments, the agriculturally active ingredient as a salt is selected from the group consisting of glufosinate, glyphosate, 2,4 D, dicamba, or other ionic active ingredients.

In embodiments, the agriculturally active ingredient is present. In embodiments, the agriculturally active ingredient is in a particulate form. In embodiments, the particulate is a solid particle of the agriculturally active ingredient. In embodiments, the particulate is a capsule suspension of the agriculturally active ingredient. In embodiments, the particulate is a suspension concentrate of the agriculturally active ingredient. In embodiments, the particulate is an emulsifiable concentrate of the agriculturally active ingredient. In embodiments, the particulate is a liquid particle of the agriculturally active ingredient. In embodiments, the particulate is a dispersed gel of the agriculturally active ingredient.

In embodiments, the agriculturally active ingredient comprises at least one of a virucide, a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, a piscicide, an avicide, a rodenticide, an antifeedant, a chemosterilant, and a micronutrient. In embodiments, the agriculturally active ingredient comprises at least one of a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, and a micronutrient. In embodiments, the agriculturally active ingredient comprises a virucide. In embodiments, the agriculturally active ingredient comprises a pesticide. In embodiments, the agriculturally active ingredient comprises a bactericide. In embodiments, the agriculturally active ingredient comprises an algaecide. In embodiments, the agriculturally active ingredient comprises a nematicide. In embodiments, the agriculturally active ingredient comprises a fungicide. In embodiments, the agriculturally active ingredient comprises a larvicide. In embodiments, the agriculturally active ingredient comprises an insecticide. In embodiments, the agriculturally active ingredient comprises an herbicide. In embodiments, the agriculturally active ingredient comprises an herbicide safener. In embodiments, the agriculturally active ingredient comprises a plant growth regulator. In embodiments, the agriculturally active ingredient comprises a plant activator. In embodiments, the agriculturally active ingredient comprises a synergist. In embodiments, the agriculturally active ingredient comprises an acaricide. In embodiments, the agriculturally active ingredient comprises a molluscicide. In embodiments, the agriculturally active ingredient comprises a repellant. In embodiments, the agriculturally active ingredient comprises a piscicide. In embodiments, the agriculturally active ingredient comprises an avicide. In embodiments, the agriculturally active ingredient comprises a rodenticide. In embodiments, the agriculturally active ingredient comprises an antifeedant. In embodiments, the agriculturally active ingredient comprises a chemosterilant. In embodiments, the agriculturally active ingredient comprises a micronutrient.

In embodiments, the virucide is imanin or ribavirin.

In embodiments, the bactericide is bronopol, copper hydroxide, cresol, dichlorophen, dipyrithione, dodicin, fenaminosulf, formaldehyde, hydrargaphen, 8-hydroxyquinoline sulfate, kasugamycin, nitrapyrin, octhilinone, oxolinic acid, oxytetracycline, probenazole, streptomycin, tecloftalam, or thiomersal.

In embodiments, the nematicide is an antibiotic nematicide (e.g., abamectin (AVID®), a carbamate nematicide (e.g., benomyl, carbofuran, carbosulfan, cloethocarb, oxime carbamate nematicides, alanycarb, aldicarb, aldoxycarb, or oxamyl), an organophosphorus nematicide (e.g., diamidafos, fenamiphos, fosthietan, phosphamidon, cadusafos, chlorpyrifos, dichlofenthion, dimethoate, ethoprophos, fensulfothion, fosthiazate, heterophos, isamidofos, isazofos, mecarphon, phorate, phosphocarb, terbufos, thionazin, or triazophos), acetoprole, benclothiaz, chloropicrin, dazomet, 1,2-dibromo-3-chloropropane (DBCP), dichlorophenolindophenol (DCIP), 1,2-dichloropropane, 1,3-dichloropropene, furfural, iodomethane, metam, methyl bromide, methyl isothiocyanate, or xylenols.

In embodiments, the algaecide is a bromine compound (e.g., AGRIBROM®), bethoxazin (3-benzo[b]thien-2-yl-5,6-dihydro-1,4,2-oxathiazine 4-oxide), copper sulfate, cybutryne (N-cyclopropyl-N-(1,1-dimethylethyl)-6-(methylthio)-1,3,5-triazine-2,4-diamine), dichlon (2,3-dichloro-1,4-naphthoquinone), dichlorophen (2,2-methylenebis[4-chlorophenol] or 4,4-dichloro-2,2-methylenediphenol), endothal, fentin (triphenyltin, triphenylstannylium, or fenolovo), hydrated lime (calcium hydroxide), nabam, quinoclamine (2-amino-3-chloro-1,4-naphthoquinone or ACN), quinonamid (2,2-dichloro-N-(3-chloro-1,4-naphthoquinon-2-yl)acetamide), or simazine.

In embodiments, the fungicide is an aliphatic nitrogen fungicide (e.g., butylamine, cymoxanil, dodicin, dodine, guazatine, or iminoctadine), an amide fungicide (e.g., carpropamid, chloraniformethan, cyazofamid, cyflufenamid, diclocymet, ethaboxam, fenoxanil, flumetover, furametpyr, penthiopyrad, prochloraz, quinazamid, silthiofam, triforine, benalaxyl (e.g., benalaxyl-M), furalaxyl, metalaxyl (RIDOMIL®, SUBDUE®) (e.g., metalaxyl-M), pefurazoate, benzamide fungicides (e.g., benzohydroxamic acid, fluopicolide, tioxymid, trichlamide, zarilamid, or zoxamide), furamide fungicides (e.g., cyclafuramid, furmecyclox), phenylsulfamide fungicides (e.g., dichlofluanid, tolylfluanid), valinamide fungicides (e.g., benthiavalicarb, iprovalicarb), anilide fungicides (e.g., benalaxyl (e.g., benalaxyl-M), boscalid, carboxin (VITAVAX®), fenhexamid, metalaxyl (e.g., metalaxyl-M), metsulfovax, ofurace, oxadixyl, oxycarboxin, pyracarbolid, thifluzamide, or tiadinil), benzanilide fungicides (e.g., benodanil, flutolanil, mebenil, mepronil, salicylanilide, or tecloftalam), furanilide fungicides (e.g., fenfuram, furalaxyl, furcarbanil, or methfuroxam), or sulfonanilide fungicides (e.g., flusulfamide)), an antibiotic fungicide (e.g., aureofungin, blasticidin-S, cycloheximide, griseofulvin, kasugamycin, natamycin, polyoxins, polyoxorim, streptomycin, validamycin, or strobilurin fungicides (e.g., azoxystrobin, dimoxystrobin, fluoxastrobin, kresoxim-methyl, metominostrobin, orysastrobin, picoxystrobin, pyraclostrobin, or trifloxystrobin)), an aromatic fungicide (e.g., biphenyl, chlorodinitronaphthalene, chloroneb, chlorothalonil (BRAVO®, DACONIL 2787®, EXOTHERM®, TERMIL®), cresol, dicloran, chlorobenzoles (e.g., hexachlorobenzene (HCB), pentachloronitrobenzene (PCNB) (TERRACLOR®)), pentachlorophenol (penta) (PCP) (DUROTOX®), quintozene, sodium pentachlorophenoxide, tecnazene, or tribromophenol), a benzimidazole fungicide (e.g., benomyl, carbendazim, chlorfenazole, cypendazole, debacarb, fuberidazole, mecarbinzid, rabenzazole, or thiabendazole), a benzimidazole precursor fungicide (e.g., furophanate, thiophanate, or thiophanate-methyl), a benzothioazole fungicide (e.g., bentaluron, chlobenthiazone, or (benzothiazol-2-ylthio)methyl thiocyanate (TCMTB)), a bridged diphenyl fungicide (e.g., bithionol, dichlorophen, or diphenylamine), a carbamate fungicide (e.g., benthiavalicarb, furophanate, iprovalicarb, propamocarb, thiophanate, thiophanate-methyl (CLEARY 3336®, EASOUT®), benomyl, carbendazim, cypendazole, debacarb, mecarbinzid, or diethofencarb), a conazole fungicide (e.g., climbazole, clotrimazole, imazalil, oxpoconazole, prochloraz, triflumizole, azaconazole, bromuconazole, cyproconazole, diclobutrazol, difenoconazole, diniconazole (e.g., diniconazole-M), epoxiconazole, etaconazole, fenbuconazole, fluquinconazole, flusilazole, flutriafol, furconazole (e.g., furconazole-cis), hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, or uniconazole (e.g., uniconazole-P)), a copper fungicide (e.g., Bordeaux mixture (i.e., copper sulfate/copper(II) tetraoxosulfate/cupric sulfate ($CuSO_4$) (1-2%)+calcium carbonate ($CaCO_3$) or hydroxide with or without stailizing agents ($CuSO_4.3Cu(OH)_2.3CaSO_4$)), Burgundy mixture (i.e., disodium carbonate+copper sulfate in water), Cheshunt mixture (i.e., copper(II) tetraoxosulfate and diammonium carbonate), copper acetate, copper carbonate (basic), copper hydroxide, copper naphthenate, copper oleate, copper oxychloride, copper sulfate, copper sulfate (basic), copper zinc chromate, cufraneb, cuprobam, cuprous oxide, mancopper, or oxine copper), a dicarboximide fungicide (e.g., famoxadone, fluoroimide, chlozolinate, dichlozoline, iprodione, isovaledione, myclozolin, procymidone, vinclozolin, captafol (DIFOLATAN®), captan (CAPTAN®), ditalimfos, folpet (FOLPAN®, PHALTAN®, THIOPHAL®), or thiochlorfenphim), a dinitrophenol fungicide/nitroderivative (e.g., binapacryl, dinobuton, dinocap (e.g., dinocap-4 or dinocap-6), dinocton, dinopenton, dinosulfon, dinoterbon, dinitro-ortho-cresol (DNOC), p-nonyl-dinitrophenol, or dinitrophenyl-nonyl-butyrate), a dithiocarbamate fungicide (e.g., dimethyldithiocarbamates (e.g., ferbam or ziram), ethylenebisdithiocarbamates (EBDC) (e.g., mancozeb (DITHANE®), maneb (MB)/manganese ethylene-bis-dithiocarbamate (Mn-EBDC), zineb, nabam/disodium ethylenebis(dithiocarbamate)/disodium 1,2-ethanediylbis(carbamodithioate)), or thiram (THIRAM®, TULISAN®)), propylenebisdithiocarbamates (e.g., propineb), azithiram, carbamorph, cufraneb, cuprobam, disulfiram, metam, tecoram, cyclic dithiocarbamate fungicides (e.g., dazomet, etem, or milneb), or polymeric dithiocarbamate fungicides (e.g., mancopper, metiram, polycarbamate, or propylenebisdithiocarbamates (e.g., propineb))), an imidazole fungicide (e.g., cyazofamid, fenamidone, fenapanil, glyodin, iprodione (CHIPCO26019®, ROVRAL®), isovaledione, pefurazoate, or triazoxide), an inorganic fungicide (e.g., potassium azide, potassium thiocyanate, sodium azide, sulfur fungicides (e.g., sulfur powder (SULPHUR—92%®), wettable sulphur, or lime Sulphur), mercury fungicides (e.g., mercuric chloride, mercuric oxide, mercurous chloride, agrosan GN, ceresan, semesan, perrugen, (3-ethoxypropyl)mercury bromide, ethylmercury acetate, ethylmercury bromide, ethylmercury chloride, ethylmercury 2,3-dihydroxypropyl mercaptide, ethylmercury phosphate, ethylmercury sulfate, N-(ethylmercury)-p-toluenesulphonanilide, hydrargaphen, 2-methoxyethylmercury chloride, methylmercury benzoate, methylmercury dicyandiamide, methylmercury pentachlorophenoxide, 8-phenylmercurioxyquinoline, phenylmercuriurea, phenylmercury acetate, phenylmercury chloride, phenylmercury derivative of pyrocatechol, phenylmercury nitrat, phenylmercury salicylate, thiomersal, or tolylmercury acetate), a morpholine fungicide (e.g., aldimorph, benzamorf, carbamorph, dimethomorph, dodemorph, fenpropimorph, flumorph, or tridemorph), an organophosphorus fungicide (e.g., ampropylfos, ditalimfos, edifenphos, fosetyl, hexylthiofos, iprobenfos, phosdiphen, pyrazophos, tolclofos-methyl, triamiphos, or tri-o-tolyl phosphate/tri-ortho cresyl phosphate (TOCP)), an organotin fungicide (e.g., decafentin, fentin, or tributyltin oxide), an oxathiin fungicide (e.g., carboxin or oxycarboxin), an oxazole fungicide (e.g., chlozolinate, dichlozoline, drazoxolon, famoxadone, hymexazol, metazoxolon, myclozolin, oxadixyl, or vinclozolin), a polysulfide fungicide (e.g., barium polysulfide, calcium polysulfide, potassium polysulfide, or sodium polysulfide), a pyrazole fungicide (e.g., furametpyr or penthiopyrad), a pyridine fungicide (e.g., boscalid, buthiobate, dipyrithione, fluazinam, fluopicolide, pyridinitril, pyrifenox, pyroxychlor, or pyroxyfur), a pyrimidine fungicide (e.g., bupirimate, cyprodinil, diflumetorim, dimethirimol, ethirimol, fenarimol, ferimzone, mepanipyrim, nuarimol, pyrimethanil, or triarimol), a pyrrole fungicide (e.g., fenpiclonil, fludioxonil, or fluoroimide), a quinoline fungicide (e.g., ethoxyquin or halacrinate), an 8-hydroxyquinoline sulfate (e.g., quinacetol or quinoxyfen), a quinone fungicide (e.g., benquinox, chloranil, dichlone, or dithianon), a quinolone, a quinoxaline fungicide (e.g., chinomethionat, chlorquinox, or thioquinox), a thiazole fungicide (e.g., ethaboxam, etridiazole (TRUBAN®), metsulfovax, octhilinone, thiabendazole, thiadifluor, or thifluzamide), a thiocarbamate fungicide (e.g., methasulfocarb or prothiocarb), a thiophene fungicide (e.g., ethaboxam or silthiofam), a triazine fungicide (e.g., anilazine, triazole fungicides, bitertanol, fluotrimazole, or triazbutil), a urea fungicide (e.g., bentaluron, pencycuron, or quinazamid), a systemic fungicide (e.g., oxathin derivatives (e.g., plantvax or vitavax), demosan, or bavistin), acibenzolar, acypetacs, allyl alcohol, benzalkonium chloride, benzamacril, bethoxazin, carvone, chloropicrin, 1,2-dibromo-3-chloropropane (DBCP), dehydroacetic acid, diclomezine, diethyl pyrocarbonate, fenaminosulf (LESAN®), fenitropan, fenpropidin, formaldehyde, furfural, hexachlorobutadiene, iodomethane, isoprothiolane, methyl bromide, methyl isothiocyanate, metrafenone, nitrostyrene, nitrothal-isopropyl, OCH, 2-phenylphenol, phthalide, piperalin, probenazole, proquinazid, pyroquilon, sodium orthophenylphenoxide, spiroxamine, sultropen, thicyofen, tricyclazole, zinc naphthenate, malachite green, or efosite-Al (ALIETTE®).

In embodiments, the herbicide is copper sulfate ($CuSO_4$), sulfuric acid ($H_2SO_4$), sodium chlorate ($NaClO_3$), ammonium sulfamate ($NH_4SO_3NH_2$), borax, calcium chlorate, ferrous sulfate, potassium azide, potassium cyanate sodium azide, an aliphatic or halo-aliphatic acid (e.g., dalapon/2,2-dichloro propionic acid (DOWPON®, TAFAPON®) or trichloro acetic acid (TCA) (VARITOX®)), an amide herbicide (e.g., allidochlor/N,N-diallyl-2-chloro acetamide (CDAA) (RANDOX®), beflubutamid, benzadox, benzipram, bromobutide, cafenstrole, 2-chloro-N,N-diethylacetamide (CDEA), chlorthiamid, cyprazole, dimethenamid (e.g., dimethenamid-P), diphenamid, epronaz, etnipromid, fentrazamide, flupoxam, fomesafen, halosafen, isocarbamid, isoxaben, napropamide, naptalam/N-1-naphthyohthalamic acid (ALANAP®), penoxsulam, pethoxamid, propyzamide, quinonamid, tebutam, or anilide herbicides (e.g., chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen, propanil/3,4-dichloro propionanilide (STAM F-34®, ROGUE®), benzoylprop, flamprop (e.g., flamprop-M), acetochlor, alachlor/2-chloro-2,6-diethyl-N-(methoxymethyl)-acetanilide (LASSO®), butachlor/N-(butoxymethyl)-2-chloro-2', c' ethyl acetanilide (MACHETE®), butenachlor, delachlor, diethatyl, dimethachlor, metazachlor, metolachlor (e.g., S-metolachlor), pretilachlor, propachlor/2-chloro-N-isopropyl acetanilide (RAMROD®), propisochlor, prynachlor, terbuchlor, thenylchlor, xylachlor, benzofluor, cloransulam, diclosulam, florasulam, flumetsulam, metosulam, perfluidone, profluazol, or pronamide/3,5-dichloro (N-1,1-dimethyl-2-propynyl) benzamide (KERB®))), an acryldehyde (e.g., acrolein/2-propanol or acryl aldihide (AQALIN®)), an aromatic acid herbicide (e.g., benzoic acid herbicides (e.g., chloramben, dicamba, 2,3,6-trichlorobenzoic acid (2,3,6-TBA), or tricamba), pyrimidinyloxybenzoic acid herbicides (e.g., bispyribac or pyriminobac), pyrimidinylthiobenzoic acid herbicides (e.g., pyrithiobac), phthalic acid herbicides (e.g., chlorthal), picolinic acid herbicides (e.g., aminopyralid, clopyralid, or picloram), or quinolinecarboxylic acid herbicides (e.g., quinclorac or quinmerac)), an aniline or nitrophenol (e.g., dinitamine/2,6-dinitro-3,amino-4-tri-fluoromethyl-N,N-diethyl-aniline (COBEX®), nitralin/4-(methylsulphonyl)-2,6-dinitro-N,N-dipropyniline (PLANAVIN®), penexalin/N-(ethyl propyl)-3,4-dimethyl-2,6-dinitrobenzamine (STOMP®), trifluralin/2,6-dinitro-N,N-dipropyl-4-trifluron methylaniline (TREFLAN®), fluchlorlin/N-propyl-N-(2'chloroethyl)-2,6-dintro-trifluroin-ethyl-aniline (BASALIN®), 2-methyl-4,6-dinitrophenol/dinitroorthocresol (DNOC) (SINOX®), dinoseb/4,6-dinitro-2-5-butyl phenol (DOW-WEED KILLER®), pentachlorophenol, nitrofen/

2,4-dinitro-4-trifluoro-methyl-diphenyl-ether (TOKE-25®)), an arsenical herbicide (e.g., cacodylic acid, CMA, hexaflurate, MAMA, potassium arsenite, sodium arsenite, disodium methyl arsenate (DSMA) (ANSER 184®), methane arsenic acid (MAA) (ANSAR®), monosodium methyl arsenate (MSMA) (ANSER-529®), calcium arsenate or orthoarsenate/tricalcium arsenate or orthoarsenate (CaHAsO$_4$), lead arsenate (PbHAsO$_4$), or dimethylarsonate), antibiotic herbicides (e.g., bilanafos), benzoic and phenyl acetic acid (e.g., chloramben/3-amino-2,5-dichlorobenzoic acid (AMIBEN, VEGIBEN®), dicamba/2-methoxy-3,6-dichlorobenzoic acid (Banvel-D®), fenac/2,3,6-trichlorophenyl acetic acid (FENAC®), or oxyfluorfen/2-chloro-1-(3-ethoxy-4-nitro phenoxy)-4-(trifluormethyl) benzene (GOAL®)), a benzoylcyclohexanedione herbicide (e.g., mesotrione or sulcotrione), a benzofuranyl alkylsulfonate herbicide (e.g., benfuresate or ethofumesate), a carbamate herbicide (e.g., carboxazole, chlorprocarb, dichlormate/3,4-dichlorobenzyl methyl carbamate (SIRMATE®), asulam/methyl sulfanilyl carbamate (AUSLOX®), fenasulam, karbutilate, or terbucarb), a carbanilate herbicide (e.g., barban/4-chloro-2-butynyl m-chloro-carbanilate (CARBYNE®), 1-methylpropyl C-(3-chlorophenyl)carbamate (BCPC), carbasulam, carbetamide, 2-chloroethyl N-(3-chlorophenyl) carbamate (CEPC), chlorbufam, chlorprophan/isopropyl m-chloro carbanilate (CIPC®), 2-chloro-l-methylethyl N-(3-chlorophenyl)carbamate (CPPC), desmedipham, phenisopham, phenmedipham, phenmedipham-ethyl, propham/isopropyl carbanilate (IPC®), or SWEP/3,4-dichloro carbonilate (METHYL®)), a cyclohexene oxime herbicide (e.g., alloxydim, butroxydim, clethodim, cloproxydim, cycloxydim, profoxydim, sethoxydim, tepraloxydim, or tralkoxydim), a cyclopropylisoxazole herbicide (e.g., isoxachlortole or isoxaflutole), a dicarboximide herbicide (e.g., benzfendizone, cinidon-ethyl, flumezin, flumiclorac, flumioxazin, or flumipropyn), a dinitroaniline herbicide (e.g., benfluralin, butralin, dinitramine, ethalfluralin, fluchloralin, isopropalin, methalpropalin, nitralin, oryzalin, pendimethalin, prodiamine, profluralin, or trifluralin), a dinitrophenol herbicide (e.g., dinofenate, dinoprop, dinosam, dinoseb, dinoterb, 2-methyl-4,6-dinitrophenol/dinitro-o-cresol (DNOC))(SINOX®, etinofen, or medinoterb), a diphenyl ether herbicide (e.g., ethoxyfen or nitrophenyl ether herbicides (e.g., acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen, or oxyfluorfen)), a dithiocarbamate herbicide (e.g., dazomet or metam), a halogenated aliphatic herbicide (e.g., alorac, chloropon, dalapon, flupropanate, hexachloroacetone, iodomethane, methyl bromide, monochloroacetic acid, SMA, or trichloroacetic acid (TCA)), an imidazolinone herbicide (e.g., imazamethabenz, imazamox, imazapic, imazapyr, imazaquin, or imazethapyr), a nitrile herbicide (e.g., bromobonil, bromoxynil/4-hydroxy-3,5-dibromo benzonitrile (BUCTRIL®), chloroxynil, dichlobenil/2,6-dichlorobenzonitrile (CASORON®), iodobonil, ioxynil/4-hydroxy-3-5-di-iodobenzonitrile (ACTRIL®), or pyraclonil), an organophosphorus herbicide (e.g., amiprofos-methyl, anilofos, bensulide, bilanafos, butamifos, 2,4-DEP, O-(2,4-dichlorophenyl) 0-methyl (1-methylethyl) phosphoramidothioate (DMPA), ethyl (P,P)-bis(2-ethylhexyl)phosphinate (EBEP), fosamine, phosphonomethyl amino acids/glycine derivatives (e.g., glyphosate/glycine phosphonate (ROUND-UP®) or N-(phosphonomethyl)-glycine/glufosinate), or piperophos)), a phenoxy herbicide (e.g., bromofenoxim, clomeprop, 2,4-DEB, 2,4-DEP/tris(2-(2-4-dichlorophenoxy) ethyl sulfate (FALONE®), 2,4-DES/sodium,2-(2-4-dichlorophenoxy) ethyl sulfate (SESONE®), difenopenten, disul, erbon, etnipromid, fenteracol, trifopsime, 2-(4-chlorophenoxy)acetic acid (4-CPA), 2,4-dichlorophenoxyacetic acid (2,4-D) (ETHYL ESTER®), 3,4-DA, 2-methyl-4-chlorophenoxyacetic acid (MCPA) (ACME MCPA AMINE 4®, AGRITOX®, AGRO ONE®, BORDERMASTER®, BH, MCPA®, CHIPTOX®, DED-WEED®, EMPAL®, KILSEM®, MEPHANAL®, METHOXONE®, PHOMENE®, RHONOX®, and WEEDAR®), S-ethyl 2-(4-chloro-2-methylphenoxy)ethanethioate (MCPA-thioethyl), or 2,4,5-trichlorophenoxyacetic acid (2,4,5-T) (BRUSH KILLER®) (often contaminated with 2,3,7,8-tetrachlorodibenzo-p-dioxin (TCDD)), Agent Blue, Agent Green, Agent Orange, Agent Pink, Agent Purple, Agent White, dinxol, trinoxol, bromacil, diquat, tandex, monuron, diuron, dalapon, a phenoxybutyric herbicide (e.g., 4-(4-chlorophenoxy)butanoic acid (4-CPB), (2,4-dichloro phenoxy) butyric acid (2,4-DB) (BUTAXONE®), 3,4-DB, 4-chloro-2-methyl-phenoxy) butyric acid (MCPB) (TROPOTOX®), or 4-(2,4,5-trichlorophenoxy)butanoic acid (2,4,5-TB)), an α-phenoxypropionic herbicide (e.g., silvex/2(2,4,5-trichlorophenoxy) propionic acid (WEEDONE®), 2-(4-chlorophenoxy)propanoic acid (4-CPP), dichlorprop/α-(2,4-dichlorophenoxy) propionic acid (2,4-DP®) (e.g., dichlorprop-P), 3,4-DP, fenoprop, or mecoprop/(4-chloro-2-methyl phenoxy) propionic acid (MCPP®) (e.g., mecoprop-P)), an aryloxyphenoxypropionic herbicide (e.g., chlorazifop, clodinafop, clofop, cyhalofop, diclofop, fenoxaprop (e.g., fenoxaprop-P), fenthiaprop, fluazifop (e.g., fluazifop-P), haloxyfop (e.g., haloxyfop-P), isoxapyrifop, metamifop, propaquizafop, quizalofop (e.g., quizalofop-P), or trifop), a phenylenediamine herbicide (e.g., dinitramine or prodiamine), a pyrazolyloxyacetophenone herbicide (e.g., benzofenap or pyrazoxyfen), a pyrazolylphenyl herbicide (e.g., fluazolate or pyraflufen), a pyridazine herbicide (e.g., credazine, pyridafol, pyridate, maleic hydrazide (MH)/1,2-dihydro pyridazine-3,6-dione (RETARD®)), a pyridazinone herbicide (e.g., brompyrazon, chloridazon, dimidazon, flufenpyr, metflurazon, norflurazon, oxapyrazon, or pydanon), a pyridine herbicide (e.g., aminopyralid, cliodinate, clopyralid, dithiopyr, fluroxypyr, haloxydine, picloram/4-amino-3,5,6-trichloro piclonic acid (TORDON®), picolinafen, pyriclor, thiazopyr, or triclopyr), a pyrimidinediamine herbicide (e.g., iprymidam or tioclorim), a quaternary ammonium herbicide (e.g., cyperquat, diethamquat, difenzoquat, morfamquat, diquat/1,1-ethyl-2,2 bipyridylium dibromide (REGLON®), or paraquat/1,1-dimethyl-4,4-bipyridylium dibromide (GRAMOXONE®)), a triazine herbicide (e.g., dipropetryn, triaziflam, trihydroxytriazine, chlorotriazine herbicides (e.g., atrazine/2-chloro-4-(ethyl amino)-6-(isopropyl amino)-S-triazine (ATRATAF®, RESIDOX®), chlorazine, cyanazine, cyprazine, eglinazine, ipazine, mesoprazine, procyazine, proglinazine, propazine, sebuthylazine, simazine/2-chloro-4,6-bis-(ethyl amino)-S-triazine (GESATOP®), terbuthylazine, or trietazine), methoxytriazine herbicides (e.g., atraton, methometon, prometone/prometon/2,4-bis(isopropyl amino)-6-methoxy-S-triazine (PRAMITOL®), secbumeton, simeton, or terbumeton), or methylthiotriazine herbicides (e.g., ametryne/ametryn/2-(ethyl amino)-4-(isopropyl-amino)-6-(methyl amino)-S-triazine (GESAPAX®), aziprotryne, cyanatryn, desmetryn, dimethametryn, methoprotryne, prometryn, simetryn, or terbutryn/terbutryne/2,4-bis(isopropyl amino)-6-methoxy-S-triazine (tert-butylamino)-4 (ethyl amino)-6-(methylthio)-S-triazine (IGRAN®)), a triazinone herbicide (e.g., ametridione, amibuzin, hexazinone, isomethiozin, metamitron, or metribuzin/4-amino-6-tert-butyl 3-(methylthio)-S-triazine-5(4H) one (SENCOR®)), a triazole herbicide (e.g., amitrole/3-amino-1,2,4-triazole (WEEDAZOL®), cafenstrole, epronaz, or flupoxam), a triazolone herbicide (e.g., amicarbazone, carfentrazone, flucarbazone, propoxycarbazone, or sulfentrazone), a triazolopyrimidine herbicide (e.g., cloransulam, diclosulam, florasulam, flumetsulam, metosulam, penoxsulam, uracil herbicides, butafenacil, flupropacil, isocil, lenacil, bromacil/5-bromo-6-methyl 1 3,5-butyl uracil (HYVAR-X®), or terbacil/5-chloro-6-methyl 3-T butyl uracil (SINBAR®)), aminotriazone, amitrole/3-amino-1,2,4-triazole (WEEDAZOL®), endothal/3, 6-endoxohexa hydrophthalic acid/7-oxabicyclo[2.2.1] heptane-2,3-dicarboxylic acid (ENDOTHALL®), oxadiazon/2-butyl-4-(2-,4-dichloro-5-isopropyl-1,3,4-oxadiazolin 5 oneoxyphenol) (RONSTAR®), or pyrazon/5-amino-4-chloro-2-phenyl 3 (2H) pyridazinone (PYRAMIN®)), a thiocarbamate herbicide (e.g., butylate, cycloate, diallate/S-(2,3-dichloro allyl) diisopropylthiocarbamate (AVADEX®), S-ethyldipropylthiocarbamate (EPTC) (EPTAM®), esprocarb, ethiolate, isopolinate, methiobencarb, molinate/S-ethyl hexahydro-I H-azapine 1-carbothionate (ORDAM-72®), orbencarb, pebulate, prosulfocarb, pyributicarb, sulfallate, thiobencarb, tiocarbazil, triallate/S-(2,3,3-trichloro allyl) diisopropylthiocarbamate (AVADEX BW®), vernolate (e.g., benthiocarb/S-(4-chlorobenzyl)-N, N-diethyl thio-carbamate (SATURN®, BOLERO®), 2-chloro allyl diethyl dithiocarbamate (CDEC) (VEGADEX®), bentazon/bentazone/3-isopropyl-2,1,3-benzo-thiadiazon-4-one-2,2-dioxide (BESAGRAN BSA-3510®), or parathion), a thiocarbonate herbicide (e.g., dimexano, thioperoxydicarbonic acid diethyl ester (EXD), or proxan), a substituted urea herbicide (e.g., benzthiazuron, cumyluron, cycluron, dichloralurea, diflufenzopyr, isonoruron, isouron, methabenzthiazuron, monisouron, noruron, methiuron, anisuron, buturon, linuron/3-(3,4-dichloro phenyl)-1,methoxy-l-methyl urea (LOROX®), chlorbromuron/3-(4-bromo-3-chlorophenyl)-1-methoxy-l-methyl urea (BROMEX®), chloreturon, chlorotoluron, chlorosulfuron, chloroxuron/3-(p-(p-chlorophenoxy) phenyl) 1,1-dimethyl urea (TENORON®), diuron/3-(3,4-dichlorophenyl) dimethyl urea (KARMEX®), fenuron TCA/1,1-dimethyl-3-phenyl-ureamon (trichloro acetate) (URAB®), fluometuron/1,1-dimethyl-3-(a,a,a-trifluoro m-tolyl) urea (COTORON®), monuron/3(p-chlorphenyl)-1,1-dimethylurea (TELVAR®), neburon/3,4-dichlorophenyl butyl, methyl urea (BONUS®), daimuron, difenoxuron, dimefuron, fluothiuron, isoproturon, methiuron, methyldymron, metobenzuron, metobromuron, metoxuron, monolinuron, parafluron, phenobenzuron, siduron, tetrafluron, thidiazuron, amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, oxasulfuron, primisulfuron, pyrazosulfuron, rimsulfuron, sulfometuron, sulfosulfuron, trifloxysulfuron, chlorsulfuron, cinosulfuron, ethametsulfuron, iodosulfuron, metsulfuron, prosulfuron, thifensulfuron, triasulfuron, tribenuron, triflusulfuron, tritosulfuron, buthiuron, ethidimuron, tebuthiuron, thiazafluron, or thidiazuron), C-288-methazole/2-(3,4-dichlorophenyl)-4-methyl-1,2-4-oxadiazolidine-3,5-dione (PROBE®), perfluidone/4-(phenyl sulphonyl)-1,1,1-trifluromethyl sulphono-o-toluidide (DESTUN®), fosmidomycin, acrolein, allyl alcohol, azafenidin, benazolin, benzobicyclon, buthidazole, calcium cyanamide ($CaCN_2$) (DORMEX®), cambendichlor, chlorfenac, chlorfenprop, chlorflurazole, chlorflurenol, cinmethylin, clomazone, 1-chloro-N'-(3,4-dichlorophenyl)-N,N-dimethylmethanimidamide (CPMF), cresol, ortho-dichlorobenzene, dimepiperate, fluoromidine, fluridone, flurochloridone, flurtamone, fluthiacet, indanofan, methyl isothiocyanate, nipyraclofen, OCH, oxadiargyl, oxaziclomefone, pentachlorophenol, pentoxazone, phenylmercury acetate, pinoxaden, prosulfalin, pyrazolynate, pyribenzoxim, pyriftalid, quinoclamine, rhodethanil, sulglycapin, thidiazimin, tridiphane, trimeturon, tripropindan, or tritac.

In embodiments, the herbicide safener is benoxacor, cloquintocet, cyometrinil, dichlormid, dicyclonon, dietholate, fenchlorazole, fenclorim, flurazole, fluxofenim, furilazole, isoxadifen, mefenpyr, mephenate, naphthalic anhydride, or oxabetrinil.

In embodiments, the plant activator is acibenzolar or probenazole.

In embodiments, the plant growth regulator is an anti-auxin (e.g., clofibric acid or 2,3,5-tri-iodobenzoic acid), an auxin (e.g., 2-(4-chlorophenoxy)acetic acid (4-CPA), 2,4-dichlorophenoxyacetic acid (2,4-D), 4-(2,4-dichlorophenoxy)butyric acid (2,4-DB), 2,4-DEP, dichlorprop, fenoprop, indole-3-acetic acid (IAA), indole-3-butyric acid (IBA), naphthaleneacetamide, α-naphthaleneacetic acid, 1-naphthol, naphthoxyacetic acid, potassium naphthenate, sodium naphthenate, or 2,4,5-trichlorophenoxyacetic acid (2,4,5-T)), cytokinins (e.g., 2iP, benzyladenine, kinetin, or zeatin), defoliants (e.g., calcium cyanamide, dimethipin, endothal, ethephon, metoxuron, pentachlorophenol, thidiazuron, or tribufos), ethylene inhibitors (e.g., aviglycine or 1-methylcyclopropene), ethylene releasers (e.g., 1-aminocyclopropane-1-carboxylic acid (ACC), etacelasil, ethephon, or glyoxime), gibberellins (e.g., gibberellic acid), growth inhibitors (e.g., abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat chloride, piproctanyl, prohydrojasmon, propham, 2,3,5-tri-iodobenzoic acid, morphactins (e.g., chlorfluren, chlorflurenol, dichlorflurenol, or flurenol), growth retardants (e.g., chlormequat chloride (CYCOCEL®), daminozide (B-NINE®), flurprimidol, mefluidide, paclobutrazol, tetcyclacis, or uniconazole), growth stimulators (e.g., brassinolide, forchlorfenuron, or hymexazol), benzofluor, buminafos, carvone, ciobutide, clofencet, cloxyfonac, cyclanilide, cycloheximide, epocholeone, ethychlozate, ethylene, fenridazon, heptopargil, holosulf, inabenfide, karetazan, lead arsenate, methasulfocarb, prohexadione, pydanon, sintofen, triapenthenol, or trinexapac.

In embodiments, the molluscicide is calcium arsenate, copper acetoarsenite (i.e., Paris green/pigment green 21/$C_4H_6As_6Cu_4O_{16}$)), copper sulfate, N-bromoacetamide ($C_2H_4BrNO$), metaldehyde, niclosamide, pentachlorophenol, sodium pentachlorophenoxide, phenyl methylcarbamates (e.g., cloethocarb, methiocarb, tazimcarb, thiodicarb, or trimethacarb), organotin fungicides (e.g., triethyl tin oxide, tributyl tin oxide, triphenyl acetate tin, or fentin), or trifenmorph.

In embodiments, the insecticide is a muscacide, an ectoparasiticide/acaricide (e.g., antibiotic acaricides (e.g., nikkomycins, thuringiensin, macrocyclic lactone acaricides, tetranactin, avermectin acaricides (e.g., abamectin (AVID®), doramectin, eprinomectin, ivermectin, or selamectin), or milbemycin acaricides (e.g., milbemectin, milbemycin oxime, or moxidectin)), azobenzene, benzoximate, benzyl benzoate, bromopropylate, chlorbenside, chlorfenethol, chlorfenson, chlorfensulphide, chlorobenzilate, chloropropylat, dichlorodiphenyltrichloroethane (DDT), dicofol (KELTHANE®, MITIGAN®), diphenyl sulfone, dofenapyn, fenson, fentrifanil, fluorbenside, proclonol, tetradifon, tetrasul, benomyl (BENLATE®), carbanolate, carbaryl, carbofuran, methiocarb, metolcarb, promacyl, propoxur, aldicarb, butocarboxim, oxamyl, thiocarboxime, thiofanox, binapacryl, dinex, dinobuton, dinocap (e.g., dinocap-4 or dinocap-6), dinocton, dinopenton, dinosulfon, dinoterbon, 4,6-dinitro-o-cresol (DNOC), amitraz, chlordimeform, chloromebuform, formetanate, formparanate, mite growth regulators (e.g., clofentezine, diflovidazin, dofenapyn, fluazuron, flubenzimine, flucycloxuron, flufenoxuron, or hexythiazox), organochlorine acaricides (e.g., bromocyclen, camphechlor, DDT, dienochlor (Pentac QQUAFLOW®), endosulfan, or lindane), organophosphorus acaricides (e.g., chlorfenvinphos, crotoxyphos, dichlorvos, heptenophos, mevinphos, monocrotophos, naled, schradan, tetraethyl pyrophosphate (TEPP), tetrachlorvinphos, amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton (e.g., demeton-O or demeton-S), demeton-methyl (e.g., demeton-O-methyl or demeton-S-methyl), demeton-S-methylsulphon, dialifos, diazinon, dimethoate, dioxathion, disulfoton, endothion, ethion, ethoate-methyl, formothion, malathion, mecarbam, methacrifos, omethoate, oxydeprofos, oxydisulfoton, parathion, phenkapton, phorate, phosalone, phosmet, phoxim, pirimiphos-methyl, prothidathion, prothoate, pyrimitate, quinalphos, quintiofos, sophamide, sulfotep, thiometon, triazophos, trifenofos, vamidothion, trichlorfon, isocarbophos, methamidophos, propetamphos, phosphorodiamide acaricides, dimefox, or mipafox), organotin acaricides (e.g., azocyclotin, cyhexatin (DOWCO 213®, PLICTRAN®), or fenbutatin-oxide (TORQUE®, VENDEX®)), dichlofluanid, dialifos, phosmet, acetoprole, fipronil, tebufenpyrad, vaniliprole, pyrethroid acaricides (e.g., acrinathrin, bifenthrin, cyhalothrin, cypermethrin (e.g., alpha-cypermethrin), fenpropathrin, fenvalerate, flucythrinate, flumethrin, fluvalinate (e.g., tau-fluvalinate), permethrin, or halfenprox), pyrimidifen, chlorfenapyr, chinomethionat, thioquinox, propargite, clofentezine, diflovidazin, spirodiclofen, fenothiocarb, chloromethiuron, diafenthiuron, acequinocyl, amidoflumet, arsenous oxide, bifenazate, closantel, crotamiton, disulfiram, etoxazole, fenazaflor, fenazaquin, fenpyroximate, fluacrypyrim, fluenetil, mesulfen, 2-fluoro-N-methyl-N-(1-naphthalenyl)acetamide (MNAF), nifluridide, pyridaben, sulfiram, sulfluramid, sulfur, or triarathene), an antibiotic insecticide (e.g., allosamidin, thuringiensin, macrocyclic lactone insecticides (e.g., spinosad), avermectin insecticides (e.g., abamectin (AVID®), doramectin, emamectin, eprinomectin, ivermectin, or selamectin), or milbemycin insecticides (e.g., milbemectin, milbemycin oxime, or moxidectin)), an arsenical insecticide/arsenical (e.g., calcium arsenate, copper acetoarsenite, copper arsenate, lead arsenate, potassium arsenite, or sodium arsenite), a carbamate insecticide/carbamate acetylcholinesterase (AChE) inhibitor (e.g., bendiocarb, carbaryl, benzofuranyl methylcarbamate insecticides (e.g., benfuracarb, carbofuran, carbosulfan, decarbofuran, or furathiocarb), dimethylcarbamate insecticides (e.g., dimetan, dimetilan, hyquincarb, or pirimicarb), oxime carbamate insecticides (e.g., alanycarb, aldicarb, aldoxycarb, butocarboxim, butoxycarboxim, methomyl, nitrilacarb, oxamyl (OXAMYL®), tazimcarb, thiocarboxime, thiodicarb, or thiofanox), phenyl methylcarbamate insecticides (e.g., allyxycarb, aminocarb, bufencarb, butacarb, carbanolate, cloethocarb, dicresyl, dioxacarb, 4-(ethylthio)phenyl N-methylcarbamate (EMPC), ethiofencarb, fenethacarb, fenobucarb, isoprocarb, methiocarb, metolcarb, mexacarbate, promacyl, promecarb, propoxur, trimethacarb, 3,5-dimethylphenyl N-methylcarbamate (XMC), or xylylcarb), a dinitrophenol insecticide (e.g., dinex, dinoprop, dinosam, or 2-methyl-4,6-dinitrophenol/dinitro-o-cresol (DNOC) (SINOX®)), a fluorine insecticide (e.g., fluosilicates (e.g., barium hexafluorosilicate or sodium hexafluorosilicate), cryolite, sodium fluoride, or sulfluramid), a formamidine insecticide (e.g., amitraz, chlordimeform, formetanate, or formparanate), a fumigant insecticide (e.g., acrylonitrile, carbon disulfide, carbon tetrachloride, chloroform, chloropicrin, p-dichlorobenzene1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride, or tetrachloroethane), an inorganic insecticide (e.g., borax, calcium polysulfide, copper oleate, mercurous chloride, potassium thiocyanate, or sodium thiocyanate), an insect growth regulator (e.g., chitin synthesis inhibitors (e.g., bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, or triflumuron), juvenile hormone mimics (e.g., epofenonane, fenoxycarb, hydroprene, kinoprene (ENSTAR®), methoprene, pyriproxyfen, or triprene), juvenile hormones (e.g., juvenile hormone I, juvenile hormone II, or juvenile hormone III), moulting hormone agonists (e.g., chromafenozide, halofenozide, methoxyfenozide, or tebufenozide), moulting hormones (e.g., ecdysone or ecdysterone), moulting inhibitors (e.g., diofenolan), precocenes (e.g., precocene I, precocene II, or precocene III), or dicyclanil), a nereistoxin analogue insecticide (e.g., bensultap, cartap, thiocyclam, or thiosultap), a nicotinoid insecticide (e.g., flonicamid, clothianidin, dinotefuran, imidacloprid, thiamethoxam, nitenpyram, nithiazine, acetamiprid, imidacloprid, nitenpyram, or thiacloprid), an organochlorine/chlorinated hydrocarbons insecticide (e.g., dichlorodiphenyltrichloroethane (DDT) (e.g., pp-DDT), bromo-DDT, camphechlor, dichlorodiphenyldichloroethane (ethyl-DDD), hexachlorocyclohexane (HCH) (e.g., gamma-HCH or lindane), methoxychlor, pentachlorophenol, dichlorodiphenyl-dichloroethane (TDE), cyclodiene insecticides (e.g., Aldrin, bromocyclen, chlorbicyclen, chlordane, chlordecone, dieldrin, dilor, endosulfan, endrin, 1,2,3,4,10,10-hexachloro-6,7-epoxy-1,4,4a,5,6,7,8,8a-octahydro-endo-1,4-exo-5,8-dimethanonaphthalene (HEOD), heptachlor, (1R,4S,4aS,5S,8R,8aR)-1,2,3,4,10,10-hexachloro-1,4,4a,5,8,8a-hexahydro-1,4:5,8-dimethanonaphthalene (HHDN), isobenzan, isodrin, kelevan, or mirex), voltage-gated Na$^+$ channels inhibitors, or chlorinated cyclodienes GABAA antagonists), an organophosphorus insecticide (e.g., bromfenvinfos, chlorfenvinphos, crotoxyphos, dichlorvos, dicrotophos, dimethylvinphos, fospirate, heptenophos, methocrotophos, mevinphos, monocrotophos, naled, naftalofo, phosphamidon, propaphos, schradan, tetraethyl pyrophosphate (TEPP), tetrachlorvinphos, dioxabenzofos, fosmethilan, phenthoate, acethion, amiton, cadusafos, chlorethoxyfos, chlormephos, demephion (e.g., demephion-0 or demephion-S), demeton (e.g., demeton-O or demeton-S), demeton-methyl (e.g., demeton-O-methyl or demeton-S-methyl), demeton-S-methylsulphon, disulfoton, ethion, ethoprophos, S-[(ethylsulfinyl)methyl] O,O-bis(1-methylethyl) phosphorodithioate (IPSP), isothioate, malathion, methacrifos, oxydemeton-methyl (METASYS-TOX®), oxydeprofos, oxydisulfoton, phorate, sulfotep, terbufos, thiometon, amidithion, cyanthoate, dimethoate, ethoate-methyl, formothion, mecarbam, omethoate, prothoate, sophamide, vamidothion, chlorphoxim, phoxim, phoxim-methyl, azamethiphos, coumaphos, coumithoate, dioxathion, endothion, menazon, morphothion, phosalon, pyraclofos, pyridaphenthion, quinothion, dithicrofos, thicrofos, azinphos-ethyl, azinphos-methyl, dialifos, phosmet, isoxathion, zolaprofos, chlorprazophos, pyrazophos, chlorpyrifos, chlorpyrifos-methyl, butathiofos, diazinon, etrimfos, lirimfos, pirimiphos-ethyl, pirimiphos-methyl, primidophos, pyrimitate, tebupirimfos, quinalphos, quinalphos-methyl, athidathion, lythidathion, methidathion, prothidathion, isazofos, triazophos, azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos, butonate, trichlorfon, mecarphon, fonofos, trichloronat, cyanofenphos, O-ethyl O-(4-nitrophenyl) phenylphosphonothioate (EPN), leptophos, crufomate, fenamiphos, fosthietan, mephosfolan, phosfolan, pirimetaphos, acephate (ORTHENE®), isocarbophos, isofenphos, methamidophos, propetamphos, dimefox, mazidox, mipafox, oxadiazine insecticides, or indoxacarb), a phthalimide insecticide (e.g., dialifos, phosmet, or tetramethrin), a pyrazole insecticide (e.g., acetoprole, ethiprole, fipronil, tebufenpyrad, tolfenpyrad, or vaniliprole), a pyrethroid insecticide (e.g., acrinathrin, allethrin (e.g., bioallethrin), barthrin, bifenthrin, bioethanomethrin, cyclethrin, cycloprothrin, cyfluthrin (e.g., beta-cyfluthrin), cyhalothrin (e.g., gamma-cyhalothrin or lambda-cyhalothrin), cypermethrin (e.g., alpha-cypermethrin, beta-cypermethrin, theta-cypermethrin, or zeta-cypermethrin), cyphenothrin, deltamethrin, dimefluthrin, dimethrin, empenthrin, fenfluthrin, fenpirithrin, fenpropathrin, fenvalerate (e.g., esfenvalerate), flucythrinate, fluvalinate (e.g., tau-fluvalinate (MAVRIK®)), furethrin, imiprothrin, metofluthrin, permethrin (e.g., biopermethrin or transpermethrin), phenothrin, prallethrin, profluthrin, pyresmethrin, resmethrin (e.g., bioresmethrin or cismethrin), tefluthrin, terallethrin, tetramethrin, tralomethrin, transfluthrin, etofenprox, flufenprox, halfenprox, protrifenbute, or silafluofe), a pyrimidinamine insecticide (e.g., flufenerim or pyrimidifen), a pyrrole insecticide (e.g., chlorfenapyr), a tetronic acid insecticide (e.g., spiromesifen), a thiourea insecticide (e.g., diafenthiuron, urea insecticides, flucofuron, or sulcofuron), closantel, crotamiton, thioperoxydicarbonic acid diethyl ester (EXD), fenazaflor, fenoxacrim, hydramethylnon, isoprothiolane, malonoben, metoxadiazone, nifluridide, pyridaben, pyridalyl, rafoxanide, triarathene, triazamate, fluosilicate, lethane, thanite, magnesium phosphide (DETIA GAS-EX-B-FORTE®), imidachloprid (ADMIRE®, MARATHON®, RAXIL SECUR®), insecticidal soap (M-PEDE®, SAFER SOAP®), or chinomethionat (MORESTAN®).

In embodiments, the repellant is an insect repellant, a bird repellant, or a mammal repellant. In embodiments, the repellant is an insect repellant. In embodiments, the repellant is a bird repellant. In embodiments, the repellant is a mammal repellant. In embodiments, the insect repellant is butopyronoxyl, dibutyl phthalate, N,N-diethyl-m-toluamide (DEET) (AUTAN EXTREME®), dimethyl carbate, dimethyl phthalate, ethohexadiol, hexamide, methoquin-butyl, methylneodecanamide, oxamate, picaridin/KBR 3023, Citronella, Pelargoniumon, or SS-220. In embodiments, the bird repellant is anthraquinone, chloralose, copper oxychloride/R6, diazinon, guazatine, methiocarb, thiram, trimethacarb, or ziram. In embodiments, the mammal repellant is copper naphthenate, trimethacarb, zinc naphthenate, or ziram.

In embodiments, the repellant is butopyronoxyl, dibutyl phthalate, N,N-diethyl-m-toluamide (DEET) (AUTAN EXTREME®), dimethyl carbate, dimethyl phthalate, ethohexadiol, hexamide, methoquin-butyl, methylneodecanamide, oxamate, picaridin/KBR 3023, Citronella, Pelargoniumon, SS-220, anthraquinone, chloralose, copper oxychloride/R6, diazinon, guazatine, methiocarb, thiram, trimethacarb, ziram, copper naphthenate, or zinc naphthenate.

In embodiments, the avicide is 4-aminopyridine, chloralose, endrin, fenthion, or strychnine.

In embodiments, the rodenticide is an indandione rodenticide (e.g., chlorophacinone, diphacinone, or pindone), an organophosphorus rodenticide (e.g., phosacetim), a pyrimidinamine rodenticide (e.g., crimidine), a γ-glutamyl-carboxylase inhibitor (coumarin rodenticide) (e.g., brodifacoum, bromadiolone, coumachlor, coumafuryl, coumatetralyl, difenacoum, difethialone, flocoumafen, or warfarin), an aconitase inhibitor (e.g., fluoracetamide or sodium fluoroacetate), an inorganic rodenticide (e.g., aluminum phosphide (CELPHOS®, DEGESCH FUMIGATION TABLETS®, FUMITOXIN®), arsenous oxide, white or yellow elemental phosphorus, potassium arsenite, sodium arsenite, or thallium sulfate), a thiourea rodenticide (e.g., α-naphthylthiourea (ANTU) (ANTU®)), a urea rodenticide (e.g., pyrinuron), a fumigant (e.g., calcium cyanide ($CaCN_2$) (CYMAG®), carbon monoxide (CO), carbon dioxide ($CO_2$), petrol chloroform, carbon tetrachloride ($CCl_4$), dichloroethane, ethylene dibromide, dibromochloropropane, methyl bromide, EDTC mixture, gamma-hexachlorocyclohexane (gamma-HCH), HC, lindane, a GABA antagonist (e.g., tetramine (tetramethylene disulfotetramine)), a voltage gated sodium channels inhibitor (e.g., dichlorodiphenyl trichloroethane (DDT)), bromethalin, chloralose, α-chlorohydrin, ergocalciferol, flupropadine, hydrogen cyanide, or norbomide (RATICATE®).

In embodiments, the synergist is piperonyl butoxide, piprotal, propyl isome, sesamex, sesamolin, or sulfoxide.

In embodiments, the antifeedant is chlordimeform, fentin, guazatine, or pymetrozine.

In embodiments, the chemosterilant is apholate, bisazir, busulfan, diflubenzuron, dimatif, hemel, hempa, metepa, methiotepa, methyl apholate, morzid, penfluron, tepa, thiohempa, thiotepa, tretamine, or uredepa.

In embodiments, the agriculturally active ingredient comprises a copper chromated arsenate (CCA), calcium cyanide, a dinitrophenol, a naphthylindane-1,3-dione, nicotine sulfate, nonanol, piperazine, a polybutene, potassium ethylxanthate, sodium cyanide, a thiocyanatodinitrobenzene, a trichlorotrinitrobenzene, or zinc trichlorophenoxide.

In embodiments, the agricultural formulation comprises a herbicide selected from the group consisting of glyphosate, glufosinate, thiocarbamates, difenzoquat, pyridazinone, nicotinanilide, fluridone, isoxazolidinone, diphenylether; N-phenylphthalimide, oxadiazole, triazolinone, chloroacetamides, oxyacetamide, phthalamate, N-phenylphthalimide, oxadiazole, triazolinone, acetamides, benzoylisoxazol, isoxazole, pyrazole, pyrazolium, triketone, benzofuran, acetochlor, clethodim, dicamba, flumioxazin, fomesafen, metolachlor, triasulfuron, mesotrione, topramezone, quizalofop, saflufenacil, sulcotrione, 2,4-dichlorophenoxyacetic, salts thereof, and mixtures thereof.

In embodiments, the agricultural liquid comprises a micronutrient, which comprises an element selected from the group consisting of boron, copper, manganese, iron, chlorine, molybdenum, zinc, and mixtures thereof.

In embodiments, the microfibrillated cellulose is present in a concentration from about 0.01% to about 5%. This percentage is a dry weight basis, as defined hereinabove. In embodiments, the microfibrillated cellulose is present in a concentration from about 0.01% to about 4%. In embodiments, the microfibrillated cellulose is present in a concentration from about 0.01% to about 3%. In embodiments, the microfibrillated cellulose is present in a concentration from about 0.01% to about 2%. In embodiments, the microfibrillated cellulose is present in a concentration from about 0.01% to about 1%.

In embodiments, there are provided compositions comprising: a fertilizer; and a microfibrillated cellulose.

In embodiments, the microfibrillated cellulose is pre-processed with a wetting agent or a dispersant under shear conditions and then added to the fertilizer or other high ionic strength media.

Methods of Making

In embodiments, there are provided methods of making an agricultural concentrate comprising mixing a high ionic strength liquid selected from at least one of a fertilizer, pesticide, fungicide, insecticide, herbicide, growth regulator, safener and micronutrient; and a microfibrillated cellulose.

In embodiments, there are provided methods comprising mixing a fertilizer with a microfibrillated cellulose to form a mix-ready fertilizer adjuvant. "Mix-ready" the product is suitable for adding to any agricultural formulation, including those that are sensitive to high ionic concentrations, the presence of multivalent cations, and the like.

In embodiments, the microfibrillated cellulose is added to a high ioinic media, including fertilizers, micronutrient media, and other high ionic strength media at a concentration from about 0.01% to about 5%.

In embodiments, methods further comprise adding an agriculturally active ingredient to the mix-ready fertilizer adjuvant.

III. Embodiments

Embodiment P1. A concentrate comprising:
a high ionic strength liquid, and
a microfibrillated cellulose.

Embodiment P2. The concentrate of embodiment P1, wherein the agricultural liquid comprises at least one of fertilizer, pesticide, fungicide, insecticide, herbicide, growth regulator, safener, and micronutrient.

Embodiment P3. The concentrate of embodiment P1, wherein the agricultural liquid comprises a fertilizer, wherein the fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-60:0-60:0-60, with the proviso that at least one of the value of the nitrogen, phosphorus, or the potassium source is not zero.

Embodiment P4. The concentrate of embodiment P3, wherein the nitrogen source is selected from ammonia, urea, urea phosphate, thiourea, ammonium sulfate, ammonium nitrate, potassium nitrate, ammonium phosphate, ammonium polyphosphate, ammonium chloride, diammonium phosphate (DAP), urea triazone, amino acids, aromatic nitrogen or heterocyclic nitrogen compounds, hexamethylene tetraamine, melamine, nitrobenzene, and mixtures thereof.

Embodiment P5. The concentrate of embodiment P3, wherein the phosphorous source is selected from phosphate salts, phosphite salts, calcium phosphate, nitro phosphate, potassium phosphate, mono ammonium phosphate, di-ammonium phosphate, triple super phosphate, phosphoric acid, phosphorous acid, polyphosphoric acid, HEDP (1-hydroxyethane 1,1-diphosphonic acid), AMP (Adenosine monophosphate), amino-tris(methylenephosphonic acid), phosphorous pentoxide, and mixtures thereof.

Embodiment P6. The concentrate of embodiment P3, wherein the potassium source is selected from potassium sulfate, potassium phosphate, potassium oxide, potassium hydroxide, potassium chloride, potassium nitrate, potassium carbonate, potassium bicarbonate, potassium magnesium sulfate, and mixtures thereof.

Embodiment P7. The concentrate of embodiment P1, wherein the agricultural liquid comprises a herbicide selected from the group consisting of glyphosate, glufosinate, thiocarbamates, difenzoquat, pyridazinone, nicotinanilide, fluridone, isoxazolidinone, diphenylether; N-phenylphthalimide, oxadiazole, triazolinone, chloroacetamides, oxyacetamide, phthalamate, N-phenylphthalimide, oxadiazole, triazolinone, acetamides, benzoylisoxazol, isoxazole, pyrazole, pyrazolium, triketone, topramezone benzofuran, acetochlor, clethodim, dicamba, flumioxazin, fomesafen, metolachlor, triasulfuron, mesotrione, quizalofop, saflufenacil, sulcotrione, 2,4-dichlorophenoxyacetic, salts thereof, and mixtures thereof.

Embodiment P8. The concentrate of embodiment P1, wherein the agricultural liquid comprises a micronutrient comprises an element selected from the group consisting of boron, copper, manganese, iron, chlorine, molybdenum, zinc, and mixtures thereof.

Embodiment P9. The concentrate of embodiment P1, wherein the microfibrillated cellulose is characterized in which:
i) the length and the diameter of the cellulose fibrils and fibril bundles are reduced vis-à-vis the respective length and diameter of the cellulose fibers and fiber bundles making up the cellulose that was used as a starting product; and
ii) at least a fraction of the fibril bundles and individual fibrils of the microfibrillated cellulose, having reduced length and diameter, has bifurcations on at least one end of the main fibrils into secondary fibrils, wherein said secondary fibrils have a smaller diameter than the non-bifurcated main fibril.

Embodiment P10. The concentrate of embodiment P9, wherein the number of the bifurcated ends of fibrils/fibril bundles is at least 60 bifurcated ends of fibrils per $mm^2$, as measured with an optical light microscopy at a magnification of 40 times and as measured at a solids content of 0.17% of microfibrillated cellulose in water.

Embodiment P11. The concentrate of embodiment P9, wherein the ratio of the number of the bifurcated ends of fibrils/fibril bundles of the microfibrillated cellulose relative to the number of such bifurcated ends of fibrils/fibril bundles of a reference microfibrillated cellulose is at least 5.

Embodiment P12. The concentrate of embodiment P1, wherein the concentrate is formulated as an emulsifiable concentrate (EC), suspension concentrate (SC), capsule suspension (CS), water-soluble concentrate (SL), an emulsion (EW), a micro-emulsion (ME), an oil-based suspension concentrate (OD), an aqueous suspo-emulsion (SE), or a microencapsulated suspension (CS).

Embodiment P13. A method of making an agricultural concentrate comprising:
mixing a high ionic strength liquid selected from at least one of a fertilizer, pesticide, fungicide, insecticide, herbicide, growth regulator, safener and micronutrient; and
a microfibrillated cellulose.

Embodiment P14. The method of embodiment P13, wherein the agricultural liquid comprises at least one of glyphosate, glufosinate, and a fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-40:0-50:0-40, with the proviso that at least one of the value of the nitrogen source, the phosphorus, and the potassium source is not zero.

IV. Additional Embodiments

In embodiments, there are provided compositions comprising a microfibrillated cellulose, a medium having a high ionic strength, optionally an agriculturally active compound, and optionally a biostimulant, wherein the composition exhibits thixotropy.

In embodiments, there provided compositions consisting essentially of a microfibrillated cellulose in a fertilizer.

In embodiments, there are provided kits comprising compositions consisting essentially of a microfibrillated cellulose in a fertilizer, along with instructions for tank mixing the composition.

In embodiments, there provided compositions consisting essentially of a microfibrillated cellulose in a micronutrient medium.

In embodiments, there are provided kits comprising compositions consisting essentially of a microfibrillated cellulose in a micronutrient medium, along with instructions for tank mixing the composition.

In embodiments, there provided compositions consisting essentially of a microfibrillated cellulose in a fertizer and micronutrient medium.

In embodiments, there are provided kits comprising compositions consisting essentially of a microfibrillated cellulose in a fertilizer and micronutrient medium, along with instructions for tank mixing the composition.

In embodiments, there provided compositions consisting essentially of a microfibrillated cellulose in an aqueous medium of glufosinate, glyphosate, 2,4 D, or Dicamba.

In embodiments, there are provided kits comprising compositions consisting essentially of a microfibrillated cellulose in an aqueous medium of glufosinate, glyphosate, 2,4 D, or Dicamba, along with instructions for tank mixing the composition.

In embodiments, the high ionic strength of the medium is provided by one or more ions having a concentration of at least about 5% of saturation level.

In embodiments, the high ionic strength of the medium is provided by one or more ions having a concentration of at least about 10% of saturation level.

In embodiments, the high ionic strength of the medium is provided by one or more ions having a concentration of at least about 20% of saturation level.

In embodiments, the high ionic strength of the medium is provided by one or more ions having a concentration of at least about 50% of saturation level.

In embodiments, the high ionic strength of the medium is provided by one or more ions having a concentration at about 100% of saturation level.

In embodiments, the high ionic strength of the medium is provided by one or more ions having a concentration above 100% of the saturation level and undissolved material is suspended in the composition. For example, such embodiments, include supersaturated solutions of salts with additional undissolved salts forming a suspension.

In embodiments, the medium having high ionic strength comprises a fertilizer.

In embodiments, the medium having a high ionic strength comprises an agriculturally active compound as a salt.

In embodiments, the agriculturally active compound as a salt is selected from the group consisting of glufosinate, glyphosate, and 2,4 D, Dicamba.

In embodiments, the agriculturally active ingredient is present.

In embodiments, the agriculturally active ingredient is in a particulate form.

In embodiments, the particulate is a solid particle of the agriculturally active ingredient.

In embodiments, the particulate is a capsule suspension of the agriculturally active ingredient.

In embodiments, the particulate is a suspension concentrate of the agriculturally active ingredient.

In embodiments, the particulate is an emulsion concentrate of the agriculturally active ingredient.

In embodiments, the particulate is a liquid particle of the agriculturally active ingredient.

In embodiments, the particulate is a gel of the agriculturally active ingredient.

In embodiments, the agriculturally active ingredient comprises at least one of a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, a biostimulant and a micronutrient.

In embodiments, the microfibrillated cellulose is present in a dry matter weight concentration from about 0.01% to about 5%

In embodiments, there are provided compositions comprising a fertilizer; and microfibrillated cellulose.

In embodiments, the microfibrillated cellulose is pre-processed using high shear conditions, optionally using a wetting agent, a dispersant, or combinations thereof.

In embodiments, the microfibrillated cellulose is present in a dry weight concentration from about 0.01% to about 5%.

In embodiments, there provided methods comprising mixing a fertilizer with a microfibrillated cellulose to form a mix-ready fertilizer adjuvant.

In embodiments, the microfibrillated cellulose is present in a concentration from about 0.01% to about 5%.

In embodiments, methods may further comprise adding an agriculturally active ingredient to the mix-ready fertilizer adjuvant.

EXAMPLES

The following examples are being submitted to illustrate embodiments of the present disclosure. The Examples are intended to be illustrative only and are not intended to limit the scope of the present disclosure.

General Procedures: Rheological properties were determined with a DHR-3 strain controlled rheometer (TA Instruments), using a Couettegeometry (recessed end rotor with a diameter 14 mm and height 42 mm, cup diameter 15 mm) with a Peltier temperature control system (25° C.). Storage and loss moduli (G' and G") were obtained by amplitude sweep measurements with an angular frequency of 10 rad/s. Following each measurement, the geometry was removed, cleaned with acetone and reattached. Following reattachment, the gap was 'zeroed' at 5 normal force.

Example 1

Fertilizers with and NPK value of 3-18-18 from JR Simplot and PCT were assessed for rheological structure before and after addition of 0.3% microfibrillated cellulose (MFC) from Borregaard AS, Kelzan S Plus (XG) from Kelco was also tested with the following results:

|  | % MFC | % XG | G' | G" | Viscosity (Pa·s) | Shear thinning? |
|---|---|---|---|---|---|---|
| 3-8-18 Simplot | 0 | 0.3 | 0.003 | 0.007 | 0.03 | No |
| 3-8-18 Simplot | 0 | 0 | 0.002 | 0.005 | 0.03 | No |
| 3-8-18 Simplot | 0.3 | 0 | 37.5 | 7.1 | 274 | Yes |
| 3-8-18 PCT | 0 | 0.3 | 0.005 | 0.002 | 0.02 | No |
| 3-8-18 PCT | 0.3 | 0 | 82.7 | 15.3 | 613 | Yes |

The presence of MFC in the sample created structure in the form of G', G" and shear thinning behavior in the fertilizer solution.

Example 2

Fertilizers with and NPK value of 6-24-6 from three different suppliers were assessed for rheological structure before and after addition of 0.3% microfibrillated cellulose (MFC) from Borregaard AS with the following results:

|  | % MFC | G' | G" | Viscosity (Pa·s) | Shear thinning? |
|---|---|---|---|---|---|
| 6-24-6 Blue Zone Ultra | 0 | .04 | .03 | 0.09 | No |
| 6-24-6 Blue Zone Ultra | 0.3 | 71.1 | 13.1 | 482 | Yes |
| 6-24-6 Generic | 0 | 0.01 | .02 | .05 | No |
| 6-24-6 Generic | 0.3 | 39.5 | 7.5 | 282 | Yes |
| 6-24-6 PMAX Plus | 0 | .005 | .02 | .07 | No |
| 6-24-6 PMAX Plus | 0.3 | 68.5 | 13.2 | 493 | Yes |

The presence of MFC in the sample created structure in the form of G', G" and shear thinning behavior in the fertilizer solution.

Example 3

Fertilizers with and NPK values of 6-20-5 and 7-20-3 from various suppliers were assessed for rheological structure before and after addition of 0.3% microfibrillated cellulose (MFC) from Borregaard AS with the following results:

|  | % MFC | G' | G" | Viscosity (Pa·s) | Shear thinning? |
|---|---|---|---|---|---|
| 6-20-5 Opti Start Gold | 0 | 0.008 | 0.08 | 0.14 | No |
| 6-20-5 Opti Start Gold | 0.3 | 59.3 | 11.3 | 424 | Yes |
| 7-20-3 Generic | 0 | .02 | .03 | .15 | No |
| 7-20-3 Generic | 0.3 | 37.9 | 6.9 | 271 | Yes |

The presence of MFC in the sample created structure in the form of G', G" and shear thinning behavior in the fertilizer solution.

Example 4

Fertilizers with and NPK values of 7-37-0 and 11-37-0 from various suppliers were assessed for rheological structure before and after addition of 0.3% microfibrillated cellulose (MFC) from Borregaard AS with the following results:

|  | % MFC | G' | G" | Viscosity (Pa·s) | Shear thinning? |
|---|---|---|---|---|---|
| 7-37-0 Wilbur Ellis | 0 | .002 | .03 | .04 | No |
| 7-37-0 Wilbur Ellis | 0.3 | 115 | 26.7 | 792 | Yes |
| 11-37-0 Grow Mark | 0 | .002 | .03 | .01 | No |
| 11-37-0 Grow Mark | 0.3 | 200 | 44.3 | 1486 | Yes |

The presence of MFC in the sample created structure in the form of G', G" and shear thinning behavior in the fertilizer solution.

Example 5

Fertilizers with and NPK values of 9-18-6 and 9-18-9 from various suppliers were assessed for rheological structure before and after addition of 0.3% microfibrillated cellulose (MFC) from Borregaard AS with the following results:

|  | % MFC | G' | G" | Viscosity (Pa·s) | Shear thinning? |
|---|---|---|---|---|---|
| 9-18-6 Opti Start Pro + Avail | 0 | .01 | .02 | .11 | No |
| 9-18-6 Opti Start Pro + Avail | 0.3 | 42.6 | 8.1 | 302 | Yes |
| 9-18-9 w Zinc PCT | 0 | .02 | .01 | .08 | No |
| 9-18-9 w Zinc PCT | 0.3 | 45.6 | 8.2 | 336 | Yes |

The presence of MFC in the sample created structure in the form of G', G" and shear thinning behavior in the fertilizer solution.

Example 6

High Ionic Strength biological fertilizers/adjuvants from various suppliers were assessed for rheological structure before and after addition of 0.3% microfibrillated cellulose (MFC) from Borregaard AS with the following results:

|  | % MFC | G' | G" | Viscosity (Pa·s) | Shear thinning? |
|---|---|---|---|---|---|
| Biovate | 0 | .02 | .004 | .05 | No |
| Biovate | 0.3 | 2.6 | .63 | 14.2 | Yes |
| Bunch of Bugs | 0 | .004 | .009 | .02 | No |
| Bunch of Bugs | 0.3 | 15.0 | 2.3 | 115 | Yes |

The presence of MFC in the sample created structure in the form of G', G" and shear thinning behavior in the biological solution.

Example 7

Fertilizers with and various NPK values from various different suppliers were assessed for rheological structure before and after addition of 0.3% microfibrillated cellulose (MFC) from Borregaard AS with the following results:

| | % MFC | G' | G" | Viscosity (Pa · s) | Shear thinning? |
|---|---|---|---|---|---|
| 8-24-0 OPHOS | 0 | .008 | .004 | .04 | No |
| 8-24-0 OPHOS | 0.3 | 54.6 | 9.6 | 399 | Yes |
| 9-28-1 with avail + Zinc | 0 | .008 | .02 | .04 | No |
| 9-28-1 with avail + Zinc | 0.3 | 48.3 | 9.6 | 334 | Yes |
| 10-10-5 Liquinox Grow | 0 | .0003 | .01 | .07 | No |
| 10-10-5 Liquinox Grow | 0.3 | 5.0 | .9 | 38 | Yes |
| 28-0-0 Coron | 0 | .03 | .03 | .04 | No |
| 6-24-6 PMAX Plus | 0.3 | 84.5 | 16.6 | 576 | Yes |

The presence of MFC in the sample created structure in the form of G', G" and shear thinning behavior in the fertilizer solution.

Example 8

A 8-24-0 fertilizer was evaluated in the presence of microfibrillated cellulose, and mixed at a 90 to 10 ratio with Folex EC emulsifiable concentrate (EC) to determine the development of structure in the fertilizer solution with the following results:

| | % MFC | G' | G" | Viscosity (Pa · s) | Shear thinning? | Separation after 24 hours |
|---|---|---|---|---|---|---|
| 8-24-0 OPHOS | 0 | .008 | .004 | .04 | No | No |
| 8-24-0 OPHOS | 0.3 | 54.6 | 9.6 | 399 | Yes | No |
| 8-24-0 OPHOS:Folex EC at a 90:10 ratio | 0.3 | 23.0 | 4.1 | 170 | Yes | No |

The presence of MFC in the sample created structure in the form of G', G" and shear thinning behavior in the fertilizer solution in the presence of an emulsifiable concentrate (EC). This gave us the beneficial effect of no separation of the EC in the fertilizer solution permitting a homogeneous application.

Example 9

A 6-24-6 fertilizer (PMAX Plus) was evaluated in the presence of microfibrillated cellulose, and mixed at a 90 to 10 ratio with Folex CS capsule suspension (CS) to determine the development of structure in the fertilizer solution with the following results:

| | % MFC | G' | G" | Viscosity (Pa · s) | Shear thinning? | Separation after 24 hours |
|---|---|---|---|---|---|---|
| 6-24-6 PMAX Plus | 0 | 0.005 | 0.02 | 0.07 | No | No |
| 6-24-6 PMAX Plus | 0.3 | 68.5 | 13.2 | 493 | Yes | No |
| 6-24-6 PMAX Plus:Folex CS at a 90:10 ratio | 0.3 | 17.1 | 3.8 | 114 | Yes | No |

The presence of MFC in the sample created structure in the form of G', G" and shear thinning behavior in the fertilizer solution in the presence of a capsule suspension (CS). This gave us the beneficial effect of no separation of the Capsule suspension (CS) in the fertilizer solution permitting a homogeneous application.

Example 10

A 6-24-6 fertilizer (Blue Zone Ultra) was evaluated in the presence of microfibrillated cellulose, and mixed at a 90 to 10 ratio with Impact Z suspension concentrate (SC) to determine the development of structure in the fertilizer solution with the following results:

| | % MFC | G' | G" | Viscosity (Pa · s) | Shear thinning? | Separation after 24 hours |
|---|---|---|---|---|---|---|
| 6-24-6 Blue Zone Ultra | 0 | .04 | .03 | 0.09 | No | No |
| 6-24-6 Blue Zone Ultra | 0.3 | 71.1 | 13.1 | 482 | Yes | No |
| 6-24-6 Blue Zone Ultra:Impact Z CS at a 90:10 ratio | 0.3 | 11.6 | 2.8 | 76.5 | Yes | No |

The presence of MFC in the sample created structure in the form of G', G" and shear thinning behavior in the fertilizer solution in the presence of a suspension concentrate (SC). This gave us the beneficial effect of no separation of the suspension concentrate (SC) in the fertilizer solution permitting a homogeneous application.

Example 11

A Glufosinate ammonium solution containing solubilized topramezone was evaluated in the presence of microfibrillated cellulose (MFC), and mixed at a 90 to 10 ratio with Folex EC emulsifiable concentrate (EC) to determine the development of structure in the fertilizer solution with the following results:

| | % MFC | G' | G" | Viscosity (Pa · s) | Shear thinning? | Separation after 24 hours |
|---|---|---|---|---|---|---|
| Topramezone/ Glufosinate ammonium solution with Folex EC | 0 | 0.02 | 0.09 | 0.07 | No | Yes |
| Topramezone/ Glufosinate ammonium solution with Folex EC | 0.3 | 3.97 | 1.04 | 32.2 | Yes | No |

The presence of MFC in the sample created structure in the form of G', G" and shear thinning behavior in the highly ionic solution of topramezone and glufosinate ammonium in the presence of an emulsifiable concentrate (EC). This gave us the beneficial effect of no separation of the emulsifiable concentrate (EC) in the glufosinate solution permitting a homogeneous application.

Example 12

A Glufosinate ammonium solution containing solubilized topramezone was evaluated in the presence of microfibrillated cellulose (MFC), and mixed at a 90 to 10 ratio with Folex CS capsule suspension (CS) to determine the development of structure in the fertilizer solution with the following results:

| | % MFC | G' | G" | Viscosity (Pa · s) | Shear thinning? | Separation after 24 hours |
|---|---|---|---|---|---|---|
| Topramezone/ Glufosinate ammonium solution with Folex CS | 0 | 0.04 | 0.06 | 0.18 | No | Yes |
| Topramezone/ Glufosinate ammonium solution with Folex CS | 0.3 | 6.7 | 1.6 | 51.9 | Yes | No |

The presence of MFC in the sample created structure in the form of G', G" and shear thinning behavior in the highly ionic solution of topramezone and glufosinate ammonium in the presence of a capsule suspension (CS). This gave us the beneficial effect of no separation of the Capsule suspension (CS) in the glufosinate solution permitting a homogeneous application.

Example 13

A Glufosinate ammonium solution containing solubilized topramezone was evaluated in the presence of microfibrillated cellulose (MFC), and mixed at a 90 to 10 ratio with Impact Z suspension concentrate (SC) to determine the development of structure in the fertilizer solution with the following results:

| | % MFC | G' | G" | Viscosity (Pa · s) | Shear thinning? | Separation after 24 hours |
|---|---|---|---|---|---|---|
| Topramezone/ Glufosinate ammonium solution with Impact Z | 0 | 0.09 | 0.5 | 0.65 | No | Yes |
| Topramezone/ Glufosinate ammonium solution with Impact Z | 0.3 | 32.2 | 7.7 | 196 | Yes | No |

The presence of MFC in the sample created structure in the form of G', G" and shear thinning behavior in the highly ionic solution of topramezone and glufosinate ammonium in the presence of a suspension concentrate (SC). This gave us the beneficial effect of no separation of the suspension concentrate (SC) in the glufosinate solution permitting a homogeneous application.

What is claimed is:

1. A composition comprising:
a chemically unmodified microfibrillated cellulose;
a medium having a high ionic strength;
optionally an agriculturally active compound; and
optionally a biostimulant;
wherein the composition exhibits thixotropy, and
wherein the chemically unmodified microfibrillated cellulose is processed using high shear conditions, optionally using a wetting agent, a dispersant, or combinations thereof.

2. The composition of claim 1, wherein the high ionic strength of the medium is provided by one or more ions having a concentration of at least about 5% of saturation level.

3. The composition of claim 1, wherein the high ionic strength of the medium is provided by one or more ions having a concentration of at least about 10% of saturation level.

4. The composition of claim 1, wherein the high ionic strength of the medium is provided by one or more ions having a concentration of at least about 20% of saturation level.

5. The composition of claim 1, wherein the high ionic strength of the medium is provided by one or more ions having a concentration of at least about 50% of saturation level.

6. The composition of claim 1, wherein the high ionic strength of the medium is provided by one or more ions having a concentration at about 100% of saturation level.

7. The composition of claim 1, wherein the high ionic strength of the medium is provided by one or more ions having a concentration above 100% of the saturation level and undissolved material is suspended in the composition.

8. The composition of claim 1, wherein the medium having high ionic strength comprises a fertilizer.

9. The composition of claim 1, wherein the medium having a high ionic strength comprises the agriculturally active compound as an ionic salt.

10. The composition of claim 9, wherein the ionic salt is selected from the group consisting of glufosinate, glyphosate, 2,4-dichlorophenoxyacetic acid, and 2-methoxy-3,6-dichlorobenzoic acid.

11. The composition of claim 1, wherein the agriculturally active compound is present.

12. The composition of claim 11, wherein the agriculturally active compound is in the form of a particulate.

13. The composition of claim 12, wherein the particulate is a solid particle of the agriculturally active compound.

14. The composition of claim 12, wherein the particulate is a capsule suspension of the agriculturally active compound.

15. The composition of claim 12, wherein the particulate is a suspension concentrate of the agriculturally active compound.

16. The composition of claim 12, wherein the particulate is an emulsion concentrate of the agriculturally active compound.

17. The composition of claim 12, wherein the particulate is a liquid particle of the agriculturally active compound.

18. The composition of claim 12, wherein the particulate is a gel of the agriculturally active compound.

19. The composition of claim 11, wherein the agriculturally active compound comprises at least one of a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, a biostimulant, or a micronutrient.

20. The composition of claim 1, wherein the chemically unmodified microfibrillated cellulose is present in a dry matter weight concentration from about 0.01% to about 5%.

21. The method of claim 1, wherein the chemically unmodified microfibrillated cellulose is present in a concentration from about 0.01% to about 1% on a dry weight basis.

22. The composition of claim 1, wherein the wetting agent, the dispersant, or combinations thereof is present.

23. The composition of claim 1, wherein the chemically unmodified microfibrillated cellulose is processed prior to mixing with the medium having a high ionic strength.

24. A composition comprising:
a fertilizer; and
a chemically unmodified microfibrillated cellulose; wherein an amount of fertilizer present in the composition imparts a high ionic strength, and wherein the chemically unmodified microfibrillated cellulose is processed using high shear conditions, optionally using a wetting agent, a dispersant, or combinations thereof.

25. The composition of claim 24, wherein the wetting agent, the dispersant, or combinations thereof is present.

26. The composition of claim 24, wherein the chemically unmodified microfibrillated cellulose is present in a dry matter weight concentration from about 0.01% to about 5%.

27. The composition of claim 24, wherein the chemically unmodified microfibrillated cellulose is processed prior to mixing with the fertilizer or to mixing with the fertilizer.

28. A method comprising:
mixing a fertilizer with a chemically unmodified microfibrillated cellulose to form a mix-ready fertilizer adjuvant, wherein an amount of fertilizer present in the adjuvant imparts a high ionic strength, and wherein the chemically unmodified microfibrillated cellulose is processed using high shear conditions, optionally using a wetting agent, a dispersant, or combinations thereof.

29. The method of claim 28, wherein the chemically unmodified microfibrillated cellulose is present in a concentration from about 0.01% to about 5%.

30. The method of claim 28, further comprising adding an agriculturally active ingredient to the mix-ready fertilizer adjuvant.

31. The method of claim 28, wherein the fertilizer is a fertilizer concentrate.

32. The method of claim 28, wherein the wetting agent, the dispersant, or combinations thereof is present.

33. The method of claim 28, wherein the chemically unmodified microfibrillated cellulose is processed prior to mixing with the fertilizer.

* * * * *